(12) United States Patent
Kubo et al.

(10) Patent No.: US 9,591,570 B2
(45) Date of Patent: Mar. 7, 2017

(54) METHOD AND SYSTEM FOR TRACKING DEVICES

(71) Applicant: Aruba Networks, Inc., Sunnyvale, CA (US)

(72) Inventors: Kiyo Kubo, Portland, OR (US); Nicholas Farina, Portland, OR (US)

(73) Assignee: Aruba Networks, Inc., Sunnyvale, CA (US)

(*) Notice: Subject to any disclaimer, the term of this patent is extended or adjusted under 35 U.S.C. 154(b) by 135 days.

(21) Appl. No.: 14/680,920

(22) Filed: Apr. 7, 2015

(65) Prior Publication Data

US 2015/0289207 A1    Oct. 8, 2015

Related U.S. Application Data

(60) Provisional application No. 61/976,314, filed on Apr. 7, 2014.

(51) Int. Cl.
*H04W 52/02* (2009.01)
*H04W 4/02* (2009.01)
*H04W 4/04* (2009.01)
*H04W 8/00* (2009.01)
*H04W 4/00* (2009.01)
*H04W 56/00* (2009.01)

(52) U.S. Cl.
CPC ....... *H04W 52/0219* (2013.01); *H04W 4/008* (2013.01); *H04W 4/023* (2013.01); *H04W 4/04* (2013.01); *H04W 8/005* (2013.01); *H04W 56/002* (2013.01)

(58) Field of Classification Search
CPC ... H04W 52/0219; H04W 4/023; H04W 4/04; H04W 8/005; H04W 4/008; H04W 56/002; H04B 7/024
USPC .................. 370/311; 455/41.2, 456.3, 456.6; 701/522, 537; 709/223
See application file for complete search history.

(56) References Cited

U.S. PATENT DOCUMENTS

| 2013/0065584 | A1* | 3/2013 | Lyon | H04W 28/06 455/434 |
| 2015/0172902 | A1* | 6/2015 | Kasslin | H04L 45/745 370/328 |
| 2015/0278867 | A1* | 10/2015 | Lerman | G06Q 30/0261 705/14.58 |

* cited by examiner

*Primary Examiner* — Charles C Jiang
*Assistant Examiner* — Wali Butt
(74) *Attorney, Agent, or Firm* — Brooks, Cameron & Huebsch, PLLC

(57) ABSTRACT

Described herein are systems, methods and computer program products for controlling operation of wireless beacons, such as Bluetooth Low Energy beacons. Multiple beacons may be controlled centrally or may work together in a cooperative fashion such that related advertisement signals are transmitted by each beacon in a cooperative fashion to allow, for example, long-term indoor tracking of mobile devices in standby, locked, or sleep modes or with applications in background or non-execution states.

20 Claims, 11 Drawing Sheets

METHOD AND SYSTEM FOR TRACKING DEVICES

CROSS REFERENCE TO RELATED APPLICATIONS

This application claims the benefit of and priority to U.S. Provisional Application No. 61/976,314, filed Apr. 7, 2014, which is hereby incorporated by reference in its entirety.

FIELD

The present disclosure generally relates to wireless beacons and to wireless communication between devices. Specifically, various techniques and systems are provided for synchronizing wireless beacons such that they simultaneously or substantially simultaneously transmit related advertisements and cycle through different beacon identifiers in order to keep a background application executing on a mobile device.

SUMMARY

Described herein are techniques for controlling wireless beacons, such as battery powered Bluetooth Low Energy beacons. Multiple beacons may be controlled centrally or may work together in a cooperative fashion such that related advertisement signals are transmitted by each beacon in a cooperative fashion to allow, for example, long-term indoor tracking of wireless devices in standby, locked, or sleep modes or with applications in background or non-execution states.

Wireless beacons typically operate by broadcasting beacon signals, also referred to herein as advertisements, advertisement packets and wireless advertisement packets. Wireless beacon signals can be received by other devices and used for a variety of actions including the ability to perform device self-location tracking, event automation, etc. In embodiments, beacon signals are radio frequency broadcasts made by a wireless beacon that contain small amounts of digital data, such as in a packet, for which no response is requested or expected. In embodiments, beacon signals are repetitive transmissions that announce a presence of a wireless beacon, typically providing an identifier for a wireless beacon. In various embodiments, a beacon signal includes one or more beacon identifiers, such as a 16 byte first identifier, which may be referred to herein as a universally unique identifier (UUID), a 2 byte second identifier, which may be referred to herein as a Major Identifier, and a 2 byte third identifier, which may be referred to herein as a Minor Identifier.

Various wireless signals can be broadcast by a wireless beacon, though in order to be useful, an agreed upon standard is needed to allow a data packet included in a wireless signal to be properly understood by other devices. Useful communications standards that a wireless beacon may be compliant with include, but are not limited to, Bluetooth, Zigbee, Z-wave and other low power radio frequency data communications standards. In embodiments, a low power radio frequency data communications standard provides for less power usage and/or longer battery life than conventional radio frequency data communications standards typically used for high bandwidth data communications, like IEEE 802.11. For example, the Bluetooth Low Energy specification limits output power of a Bluetooth Low Energy device to 10 mW (+10 dBm), while 802.11 power limits are regulated by the FCC, which permits, in some instances, output powers up to 1 W (+30 dBm).

In various embodiments, a wireless beacon is compliant with one or more Bluetooth specifications, such as Bluetooth 4.0 or Bluetooth Low Energy, also referred to herein as BLE, or Bluetooth Smart. In embodiments, a wireless beacon is compliant with the Apple iBeacon specification. In embodiments, a wireless beacon is compliant with the AltBeacon specification, authored by Radius Networks.

One advantage of using Bluetooth as a communications standard for a wireless beacon is the large installed base of Bluetooth compliant tablets, mobile phones and computers that can detect Bluetooth beacon signals. An advantage of BLE compliant beacons is the reduced power requirements as compared to, for example, WiFi based beacons. Due to their low power requirements, BLE beacons can operate for long periods of time, such as weeks, months or years, on coin cell batteries, allowing large numbers of beacons to be employed at a venue to allow venue-wide transmission and/or detection of beacon signals without requiring electrical power infrastructure.

In order to be remotely configurable, in embodiments, wireless beacons include a wireless receiver allowing for receipt of data packets from other devices. For example, in one embodiment, a wireless beacon is capable of both transmitting and receiving Bluetooth compliant signals, such as BLE signals. In this way, signals can be received at a wireless beacon, allowing the beacon to change its configuration or provide status information in response to a received status request.

In embodiments, the wireless beacon includes a wireless transceiver useful for wireless communications with other wireless devices, such as other beacons, central devices, peripheral devices, etc. Useful wireless communications standards for beacons include a Bluetooth standard, a Bluetooth v4.0 (or greater) standard and/or a Bluetooth Low Energy standard.

In an aspect, provided are methods for synchronizing wireless advertisement packet transmissions of a plurality of beacons. In one embodiment of this aspect, a method comprises determining a synchronized advertisement order, transmitting a first wireless advertisement packet according to the synchronized advertisement order, and transmitting a second wireless advertisement packet according to the synchronized advertisement order. Optionally, various method embodiments further comprise transmitting additional wireless advertisement packets according to the synchronized advertisement order. In embodiments, the first wireless advertisement packet includes a first beacon identifier and the second wireless advertisement packet includes a second beacon identifier that is different from the first beacon identifier. Additional wireless advertisement packets transmitted according to the synchronized advertisement order optionally include additional different beacon identifiers. Optionally, transmitting a wireless advertisement packet includes transmitting a plurality of wireless advertisement packets during an advertisement time period, such as a plurality of identical wireless advertisement packets during the advertisement time period.

In embodiments, the synchronized advertisement order identifies a sequence for transmitting a plurality of wireless advertisement packets. Optionally, the sequence is repeated. Optionally advertisement packets are repeatedly transmitted. For example, when the advertisement order specified in the sequence completes, the sequence starts again. In this way, the sequence can repeat an unlimited number of times.

In exemplary embodiments, the synchronized advertisement order is associated with concurrent wireless advertisement packet transmissions by multiple wireless beacons. In an exemplary embodiment, wireless advertisement packets transmitted concurrently by multiple wireless beacons include a same beacon identifier. In exemplary embodiments, concurrent wireless advertisement packets transmitted by multiple wireless beacons are transmitted at substantially a same time as another wireless beacon transmits wireless advertisement packets.

Optionally, receiving a wireless advertisement packet including a beacon identifier at a wireless device causes the wireless device to execute an application for a predetermined amount of time. For example, a wireless device may be monitoring for one or more specific beacon identifiers. Receiving any one or more of the specific beacon identifiers may cause the wireless device to execute an application for a predetermined amount of time.

In some embodiments, receiving multiple wireless advertisement packets at a wireless device may cause the wireless device to execute the application for only a single predetermined amount of time. In some embodiments, receiving multiple wireless advertisement packets at a wireless device may cause the wireless device to execute the application for multiple predetermined amounts of time. For example, in some embodiments, an operating system operating on a mobile device may limit the frequency and/or repetition rate of application executions in response to multiple received advertisement packets, such as multiple received advertisement packets that all include a same beacon identifier. Optionally, transmitting a wireless advertisement packet according to the synchronized advertisement order includes transmitting a plurality of wireless advertisement packets during an advertisement time period. In an exemplary embodiment, the plurality of wireless advertisement packets includes a same beacon identifier. Optionally, the advertisement time period corresponds to the predetermined amount of time.

In embodiments, a wireless advertisement packet including a beacon identifier received at a wireless device can trigger a first execution of an application. Optionally, an additional wireless advertisement packet including the same beacon identifier received at the wireless device can trigger a secection execution of the application when the wireless advertisement packet is received after a wireless advertisement reset duration, also referred to herein as a timeout period. Optionally, an additional wireless advertisement packet including the same beacon identifier received at the wireless device may not trigger a secection execution of the application when the wireless advertisement packet is received before a wireless advertisement reset duration expires. For example, a wireless advertisement reset duration corresponds to a time period during which repeated wireless advertisement packets including a same beacon identifier received at the wireless device do not cause the wireless device to execute the application more than once. In one embodiment, the synchronized advertisement order indicates that the sequence is to be repeated after a wireless advertisement reset duration of a wireless device expires. In this way, the sequence can be re-used to cause an application on a mobile device to continue executing.

In embodiments, for example, a method of this aspect further comprises synchronizing transmissions of wireless advertisement packets according to an advertisement schedule. Optionally, the advertisement schedule identifies wireless advertisement packet transmission times, such as the order and moments when specific wireless advertisement packets are to be transmitted.

Optionally, a wireless advertisement packet includes one or more beacon identifiers. As described above, in various embodiments, different beacon identifiers are used for different wireless advertisement packets in a sequence. In various embodiments, however, only one of the beacon identifiers that is included in a wireless advertisement packet is different from the beacon identifiers in other wireless advertisement packets.

For example, in one embodiment, a beacon identifier is a universally unique identifier (UUID), a Major identifier or a Minor identifier. Optionally, a beacon identifier is a universally unique identifier (UUID), and a UUID of one wireless advertisement packet in a sequence is different from another UUID of another wireless advertisement packet in the sequence. Optionally, a wireless advertisement packet includes a universally unique identifier (UUID), and a first UUID of the first wireless advertisement packet and a second UUID of the second wireless advertisement packet are a same UUID. Optionally, a beacon identifier is a Major or Minor identifier, and a first Major or Minor identifier of the first wireless advertisement packet is different from a second Major or Minor identifier of the second wireless advertisement packet.

In exemplary embodiments, a beacon identifier is universally unique identifier (UUID), a wireless advertisement packet includes a Major identifier or a Minor identifier, and wireless advertisement packets transmitted concurrently by multiple wireless beacons include a same UUID. Optionally, a wireless advertisement packet includes a universally unique identifier (UUID), a Major identifier or a Minor identifier, and wireless advertisement packets transmitted concurrently by multiple wireless beacons include a same Major identifier or a same Minor identifier.

In other aspects, systems are provided, such as systems for performing the methods described herein. For example, in one embodiment, methods described herein are performed by wireless beacons. In exemplary embodiments, a system of this aspect comprises one or more processors, and a non-transitory computer readable storage medium communicatively coupled or otherwise positioned in data communication with the one or more processors. In embodiments, the non-transitory computer readable storage medium includes instructions that, when executed by the one or more hardware processors, cause the one or more hardware processors to perform one or more of the methods described herein.

In other aspects, computer program products are provided, such as computer program products configured to achieve methods described herein. In exemplary embodiments, a computer program product of this aspect is a non-transitory computer readable storage medium comprising instructions that, when executed by one or more hardware processors, cause the one or more hardware processors to perform one or more of the methods described herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

Illustrative embodiments of the present invention are described in detail below with reference to the following drawing figures.

DETAILED DESCRIPTION

Figure 1:
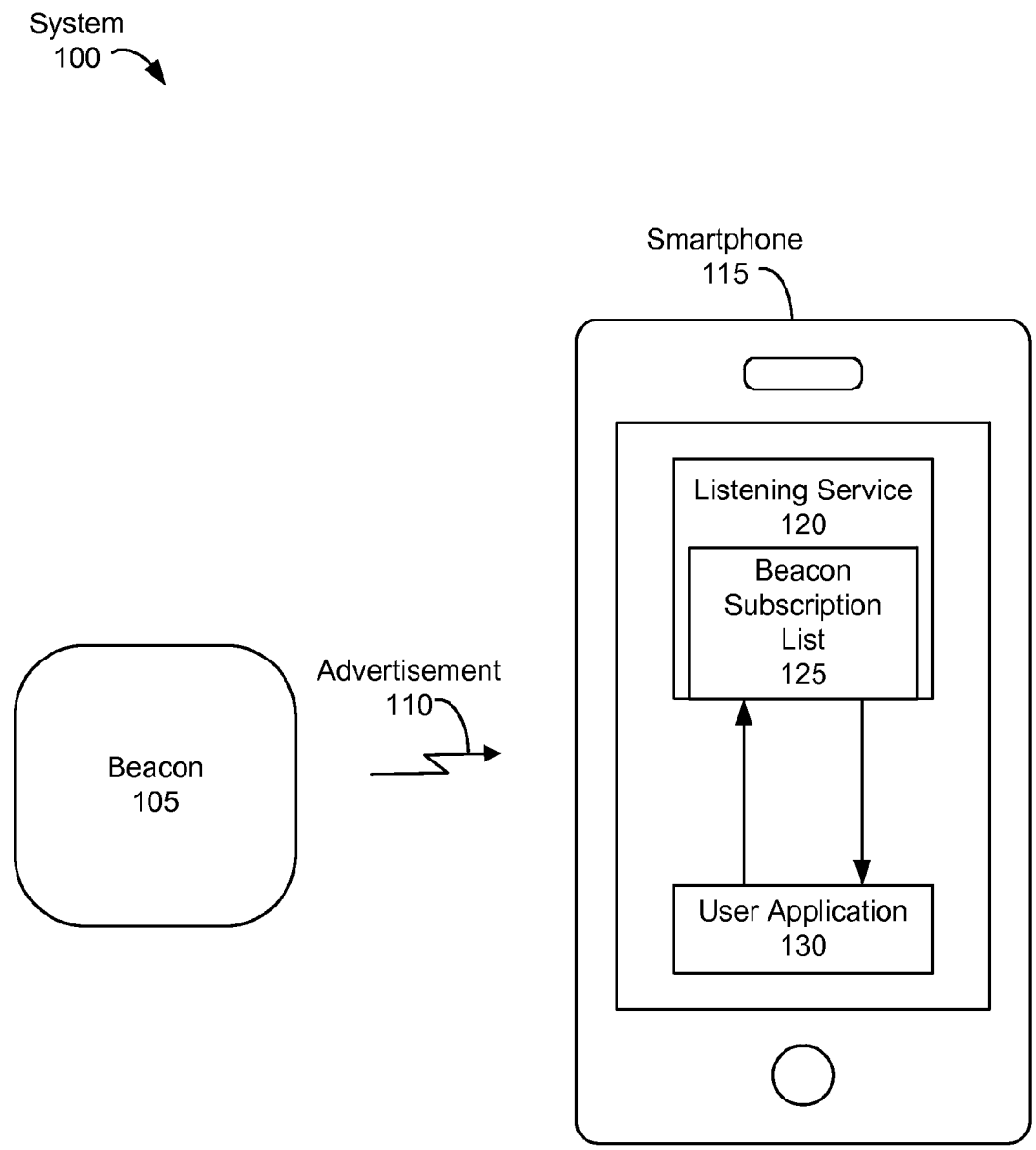
FIG. 1 shows a schematic diagram in accordance with one or more embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The terms "machine-readable storage medium" and "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

In some aspects, embodiments provide methods, computer readable media and systems that employ BLUETOOTH® Low Energy (BLE) compliant signals (BLUETOOTH is a registered trademark of Bluetooth SIG, Inc., Kirkland, Wash., USA, and is referred to herein as "Bluetooth"). Throughout this detailed description, reference will be made to the Bluetooth and BLE standards, as well as Bluetooth and/or BLE devices. Bluetooth is a standardized wireless technology for exchanging data over short distances (approximately 330 feet or less). Bluetooth is a widely adopted standard with millions of Bluetooth enabled devices in existence. Bluetooth devices may include, but are not limited to: smartphones, speakers, watches, mice, keyboards, beacons, laptops, desktop computers, tablets, etc.

BLE, in comparison to Bluetooth, provides reduced power consumption while maintaining a similar communication range. BLE is ideal for devices that are powered by a small battery that may not even be rechargeable. In fact, BLE devices may be able to operate for months or even years on a single button cell, such as a watch battery. BLE devices may even be disposable. However, many more robust devices, such as smartphones (or any of the devices mentioned above when discussing Bluetooth), may be able to use both Bluetooth and BLE. BLE is not backwards compatible with Bluetooth, however, although devices that support both Bluetooth and BLE may use a single radio antenna.

When referring to Bluetooth or BLE devices, a central device, such as a smartphone, initiates commands and requests. A peripheral device, such as a beacon, receives commands and requests and returns responses. Peripheral devices also can broadcast advertisements, such as signals which announce a peripheral device's presence, but for which no response is expected or, in some configurations, for which no response can be received. A characteristic or status is a data value that is transferred between the peripheral device and the central device, such as battery power. A service is a grouping of related characteristics. Further specific, intricate details of how connections are established between devices, how messages are sent, and other aspects of the Bluetooth and BLE standards are widely available in the published literature, and the details of such will not be repeated here.

FIG. 1 shows a system 100 which includes a wireless beacon 105, which transmits one or more advertisements 110, such as a wireless advertisement packet. Smartphone 115 may receive advertisement 110, for example, if smartphone 115 is within a suitable reception radius from beacon 105. In order to receive and make use of advertisement 110, smartphone 115 includes a wireless antenna and an associated receiver. Software or firmware may further be present on smartphone 115 to control the receiver in order to detect advertisement 110. In some embodiments, software or firmware present on smartphone 115 may directly interface with the receiver for detection of advertisement 110. In some embodiments, an operating system or device driver present on smartphone 110 may interface with the receiver for detection of advertisement 110. Exemplary operating systems include personal computer operating systems, such as Windows, Linux, Apple OS X, etc. Exemplary operating systems include mobile operating systems, such as iOS, Android, Windows Phone OS, BlackBerry OS, etc.

In one embodiment, a listening service 120 present on smartphone 115 may provide an interface between the receiver and a user application 130 running on smartphone 115. Use of listening service 120 is advantageous, in embodiments, because such a configuration may minimize the complexity of user application 130 and allow multiple user applications to simultaneously and/or sequentially be alerted of detected advertisement 110.

Additionally, user application 130 may directly monitor for advertisement 110 while it is actively running on smartphone 115, such as through various application program interface (API) calls. In some embodiments, however, when user application 130 is not actively running or in a sleep, standby, background, or other non-executing mode, user application 130 may not be able to directly monitor for advertisement 110. By employing listening service 120 to alert user application 130 of detected advertisements, user application 130 can, indirectly, continuously monitor for advertisements, as listening service 120 can execute continuously even while user application 130 is in a sleep, standby, background or other non-executing mode.

Optionally, listening service 120 includes or makes use of a beacon subscription list 125, which may be populated with one or more beacon identifiers by user application 130 and used by listening service 120 to alert user application 130 of detected advertisements including beacon identifiers added to beacon subscription list 125. Beacon subscription list 125 may be populated, in embodiments, by user application 130 with multiple beacon identifiers so that any one or more beacon identifiers present in one or more received advertisements can generate an alert to user application 130. Optionally, beacon subscription list may be of a fixed length or allow only a fixed number of entries for a single user application 130.

In one embodiment, an advertisement 110 detected by listening service 120 that includes a beacon identifier present on beacon subscription list 125 will cause user application 130 to execute for a predetermined amount of time, even if user application 130 is not actively running or is in a sleep, standby, background or other non-executing state on smartphone 115. In embodiments, the predetermined amount of time is variable. In embodiments, the predetermined amount of time is controlled or otherwise dictated by the firmware, software, or operating system present on smartphone 115. For example, the predetermined amount of time may correspond to 1 second, 5 seconds, 10 seconds, 15 seconds, or another time duration as specified in an operating system or by listening service 120 present on smartphone 115.

Figure 2:
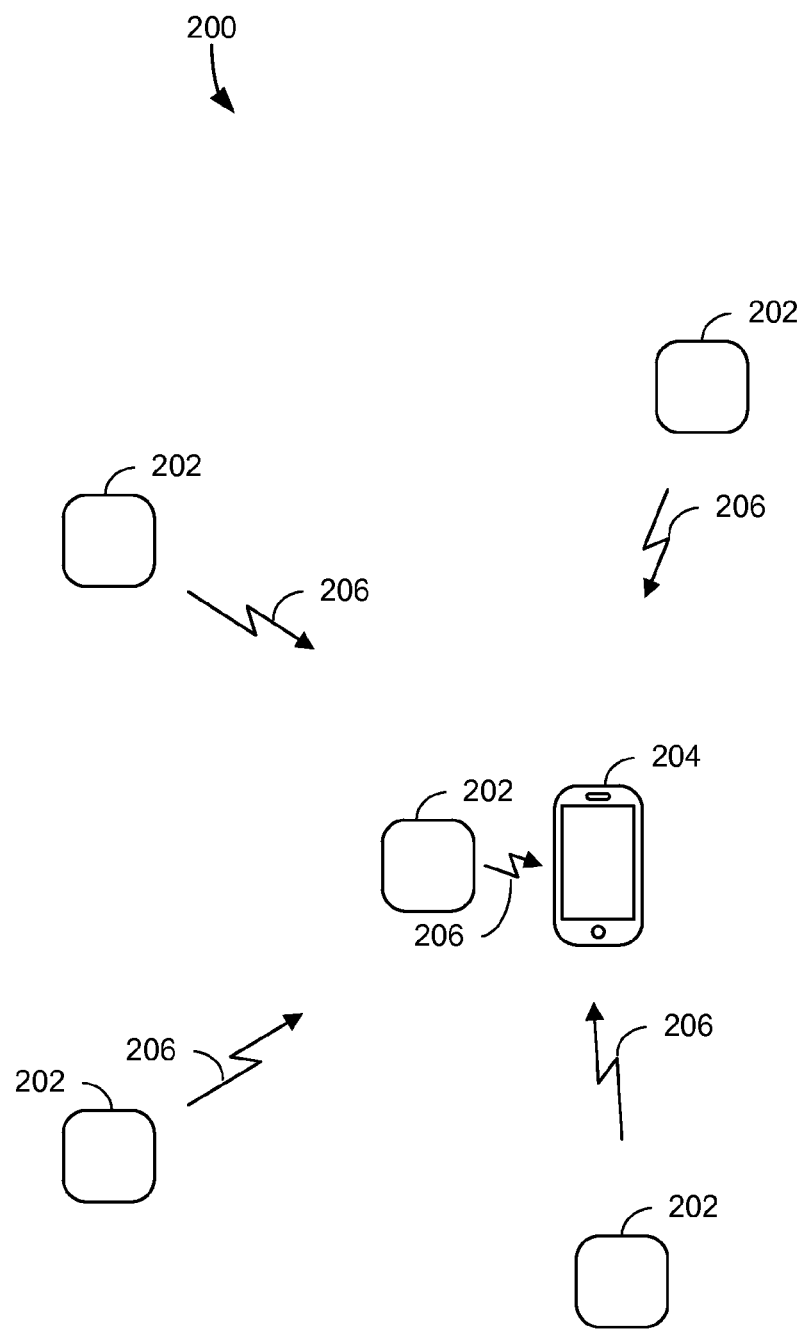
FIG. 2 provides an illustration of an example wireless communications environment, in accordance with some embodiments.

Optionally, multiple wireless beacons are employed to allow for location tracking by a central device. FIG. 2 illustrates an example wireless communications environment 200 including 5 peripheral devices, exemplified as beacons 202 and a central device, exemplified as a smartphone 204. Each beacon 202 is configured to transmit wireless advertisement packets 206, such that smartphone 204 can receive the advertisement packets 206 from any and/or all of the beacons 202, depending on the location of the smartphone 204 relative to the beacons 202. As will be understood by the skilled artisan, beacons 202 transmit advertisement packets 206 regardless of whether there is any other device in the vicinity of beacon 202. In this way, beacons 202 are advertising of their presence in the environment, such that any passing device capable of receiving the broadcast can do so.

Figure 3:
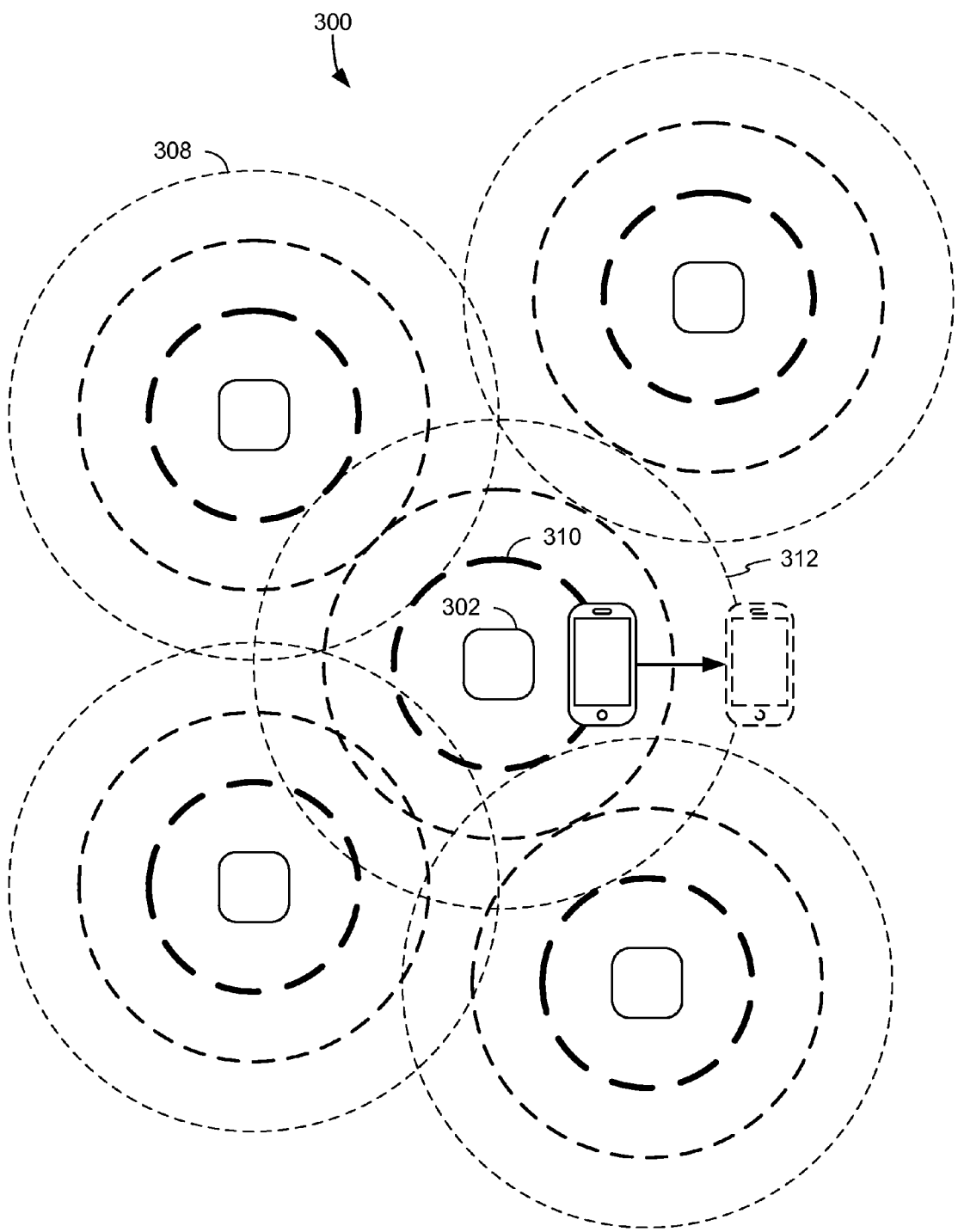
FIG. 3 provides an illustration of an example wireless communications environment, in accordance with some embodiments.

FIG. 3 provides a schematic illustration of a wireless communications environment 300, again including 5 beacons 202 and a smartphone 204. Signal strength indicators 308 schematically illustrate a detectable range of the advertisement packets broadcast by the beacons, and schematically depict that, at a distance 310 close to beacon 302, the received signal strength would be higher than at a more distant location 312 from a beacon 302. The smartphone 204 is further depicted as travelling away from beacon 302, during which time, received signal strengths of advertisement packets would reduce.

Figure 4A:
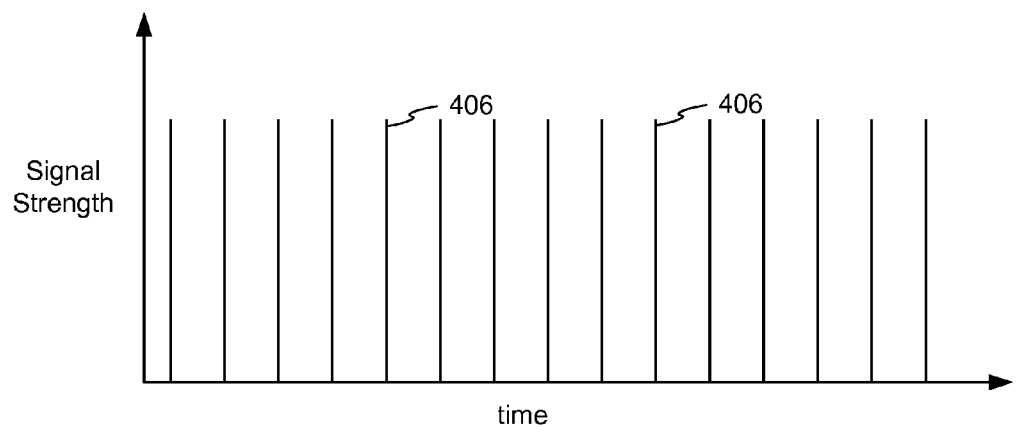
FIG. 4A and FIG. 4B provides schematic illustration of plots of detected signal strength as a function of time.
Figure 4B:
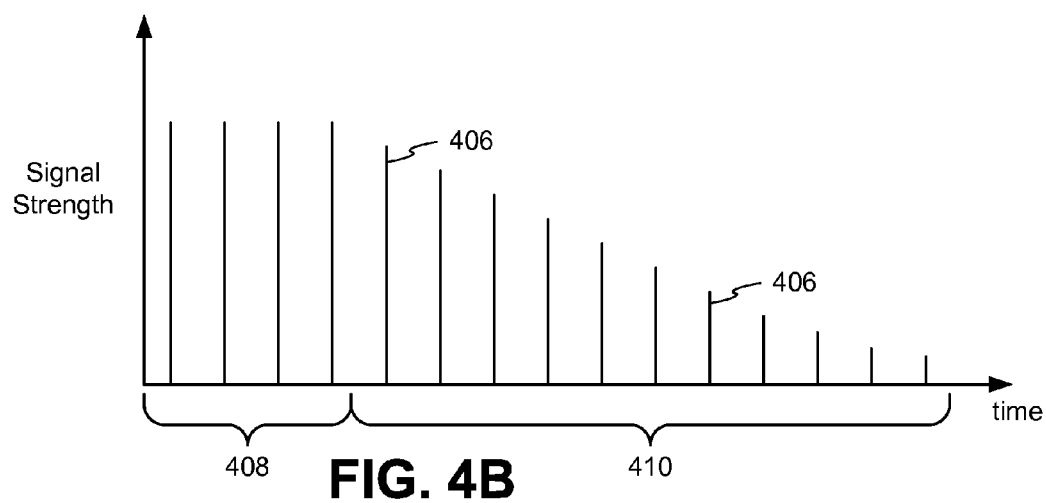
Figure 4C:
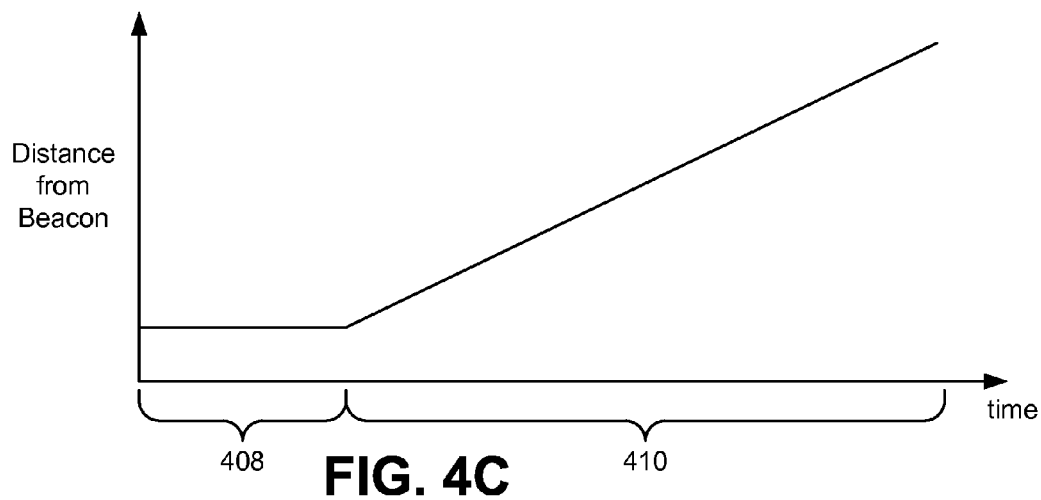
FIG. 4C provides a schematic illustration of a plot of distance from a beacon as a function of time.

FIG. 4A depicts a schematic plot showing the timing and received signal strength of advertisement packets at smartphone 204 while stationary. Multiple advertisement packets 406 are detected, each with approximately the same signal strength. FIG. 4B depicts a schematic illustration showing timing and received signal strength of advertisement packets 406 at smartphone 204 while stationary, during time period 408, and while travelling away from beacon 302, during time period 410. Multiple advertisement packets 406 received show a reduction in received signal strength while the smartphone 204 is travelling away from beacon 302. FIG. 4C depicts a schematic illustration showing the relative position of smartphone 204 from beacon 302 during time period 408 and time period 410.

Advantageously, received wireless advertisement packets can be used for location tracking within a central device, such as a smartphone or tablet computer, as the central device can used the received signal strength as a measure of the distance from the transmitting beacon. For example, smartphone 204 can determine its own location relative to beacon 302 using the determined received signal strengths.

In various embodiments, advertisement packets transmitted by one or more beacons may be used to wake up a user application present on a central device such that the user application will execute, such as for a predetermined amount of time. For example, a wireless advertisement packet received by a central device can cause the central device to execute a user application for the predetermined amount of time, such as if the wireless advertisement packet includes an identifier that is being monitored for by the device's operating system or a listening service executing on the device. After the user application executes for the predetermined amount of time, the user application may re-enter a non-execution state.

In some embodiments, however, repeated receipts of wireless advertisement packets including the identifier may not cause continued execution of the user application, such as if a timeout period or reset duration proscribed by the operating system or listening service follows receipt of the initial wireless advertisement packet including the identifier. In such a situation, however, receiving an additional wireless advertisement packet including a different identifier can be used to cause the user application to execute for additional time, with or without the user application re-entering the non-execution state, depending on the length of the timeout period and the time of receipt of the additional wireless advertisement packet. In this way, having a wireless beacon that transmits a sequence of wireless advertisement packets that include different identifiers can be used to keep a user application in an execution mode for any desired length of time.

In order to maximize this ability in an environment where a smartphone may be in motion or stationary, a plurality of wireless beacons may be distributed across an environment, such that at any location in the environment the smartphone may be present an advertisement may be received by the smartphone. Additionally, it is advantageous that the plurality of wireless beacons be synchronized such that the plurality of wireless beacons transmits wireless advertisement packets including a common identifier at the same time or at approximately the same time. In this way, the plurality of wireless beacons may not inadvertently trigger a timeout period for specific identifiers that may be used by other beacons and prevent the configuration from maximizing the execution time of a user application on a central device.

Figure 5:
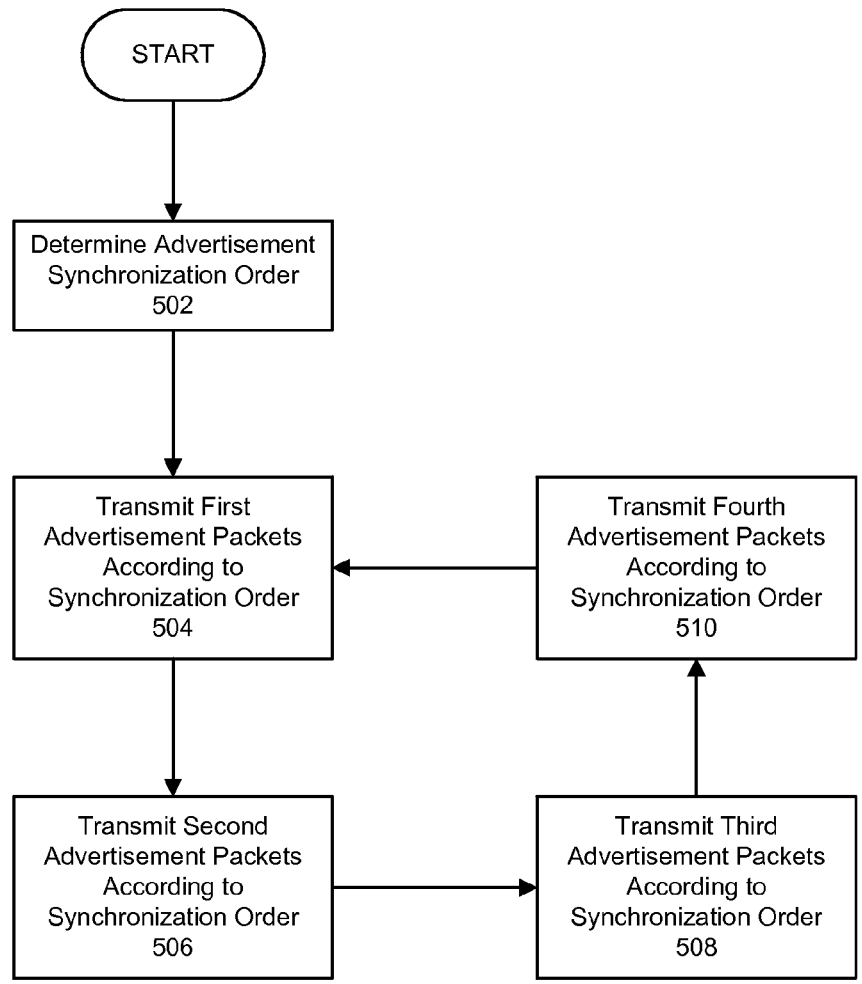
FIG. 5 provides an overview of an exemplary method in accordance with one or more embodiments.

FIG. 5 provides an overview of an exemplary method, such as a method of operating one or more wireless beacons. At 502, an advertisement synchronization order is determined. For example, the advertisement synchronization order may be preprogrammed into a wireless beacon. Alternatively, the advertisement synchronization order may be transmitted by a central device or controller to one or more wireless beacons. Optionally, one or more wireless beacons may exchange information with one another to communicate and/or determine the advertisement synchronization order. After the advertisement synchronization order is determined, a wireless beacon can proceed to operate according to the advertisement synchronization order.

For example, at 504 the wireless beacon can transmit one or more first advertisement packets according to the synchronization order. Depending on the configuration, a wireless beacon may sequentially transmit one or plurality of first advertisement packets, each including a first beacon identifier and optionally including other information. In embodiments, a plurality of advertisement packets may be separated in time by an interval identified in a wireless specification, such as the iBeacon or AltBeacon specifications. Receiving one of the first advertisement packets at a wireless device that is monitoring for first beacon identifier may result in an application executing on the wireless device for a predetermined amount of time. As described herein, receiving multiple advertisement packets at a wireless device including the same beacon identifier may not result in the application executing on the wireless device more than once unless the beacon identifier is received after a timeout or reset duration.

After a predetermined number of packets and/or a predetermined advertisement time period for transmitting first advertisement packets, the beacon proceeds to transmit one or more second advertisement packets according to the synchronization order, at 506. Again, depending on the configuration, a wireless beacon may sequentially transmit one or plurality of second advertisement packets, each including a second beacon identifier and optionally including other information. Advantageously, the second beacon identifier will be different from the first beacon identifier in order to allow the wireless device monitoring for the second beacon identifier to execute for another predetermined amount of time after receiving one of the second advertisement packets, regardless of whether a timeout or reset duration has or has not elapsed for the first beacon identifier.

At 508, the beacon proceeds to transmit one or more third advertisement packets according to the synchronization order. Again, depending on the configuration, a wireless beacon may sequentially transmit one or plurality of third advertisement packets, each including a third beacon identifier and optionally including other information. Advantageously, the third beacon identifier will be different from the first beacon identifier and the second beacon identifier in order to allow the wireless device monitoring for the third beacon identifier to execute for another predetermined amount of time after receiving one of the third advertisement packets, regardless of whether a timeout or reset duration has or has not elapsed for the first and second beacon identifiers.

At 510, the beacon proceeds to transmit one or more fourth advertisement packets according to the synchronization order. Again, depending on the configuration, a wireless beacon may sequentially transmit one or plurality of fourth advertisement packets, each including a fourth beacon identifier and optionally including other information. Advantageously, the fourth beacon identifier will be different from the first beacon identifier, the second beacon identifier, and the third beacon identifier in order to allow the wireless device monitoring for the fourth beacon identifier to execute for another predetermined amount of time after receiving one of the third advertisement packets, regardless of whether a timeout or reset duration has or has not elapsed for the first, second, and third beacon identifiers.

After the transmission of the fourth advertisement packets completes at 510, in the embodiment illustrated, the wireless beacon repeats the sequence identified in the synchronization order and proceeds, at 504, to again transmit first advertisement packets. Although the embodiment shown illustrates 4 different advertisement packets, any number of different advertisement packets may be used, such as 2, 3, 4, 5, 6, 7, 8, 9, 10, 11, 12, 13, 14, 15, 16, 17, 18, 19, 20, etc. The number of different advertisement packets utilized may be practically limited by the number of allowed beacon identifiers to be monitored by an operating system or listening service on behalf of a background or non-executing application. In embodiments, the number of different advertisement packets utilized is selected so as to allow the wireless device to continually execute the application, in spite of any timeout or reset duration of any one or more beacon identifiers.

FIGS. 6A-6D illustrate an environment 600 where multiple wireless beacons, indicated individually as wireless beacons 602-a, 602-b, 602-c, and 602-d and collectively as wireless beacons 602, are present. A central device is also present in environment 600, exemplified as smartphone 620. Each of wireless beacons 602 is configured to transmit wireless advertisement packets in a synchronized fashion, such that each of wireless beacons 602 concurrently transmits a wireless advertisement packet including the same identifier.

As used herein, the term concurrent and variations thereof (e.g., concurrently) refers to events which occur at the same time or within close time proximity to one another, for example, such that that aspects or effects of the events overlap. For example, in some embodiments, advertisement packet transmissions from two or more wireless beacons are considered concurrent if they fall within overlapping advertisement intervals. In some embodiments, advertisement packet transmissions from different wireless beacons are considered concurrent if they fall within overlapping advertisement time periods, such as a time period where multiple identical wireless advertisement packets are transmitted by a single beacon. In other words, wireless advertisement packet transmissions by different wireless beacons need not be exactly coincident in time to be considered concurrent. In some aspects, wireless beacons may be centrally managed, such as to allow internal clocks of the beacons to be synchronized or to otherwise ensure that wireless advertisement packet transmissions are concurrent.

Figure 6A:
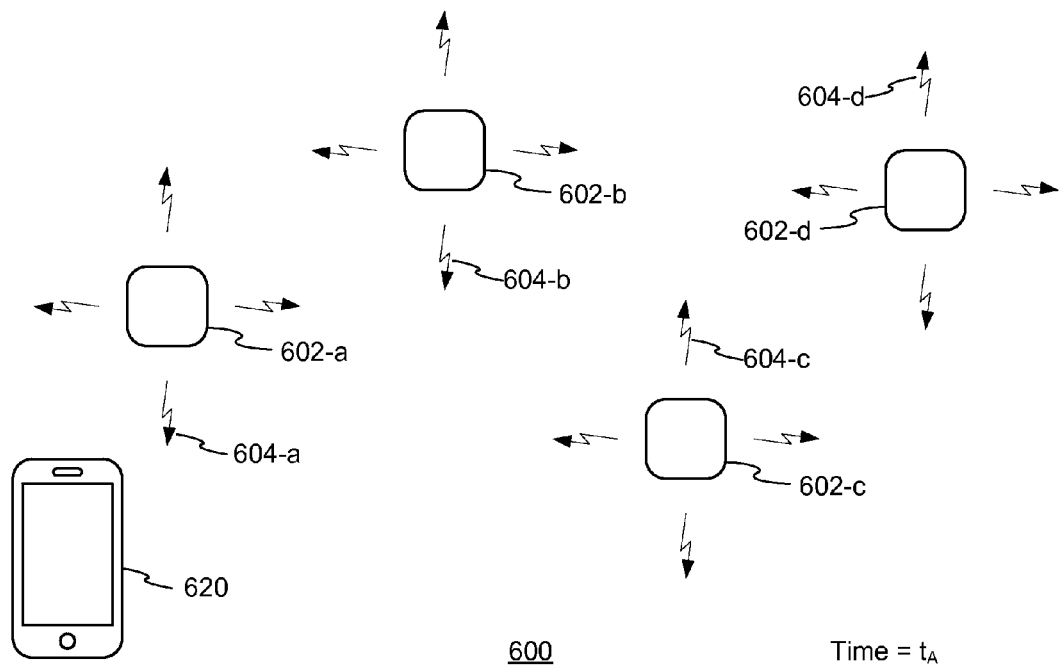
FIG. 6A, FIG. 6B, FIG. 6C and FIG. 6D show examples in accordance with one or more embodiments.

As illustrated in FIG. 6A, each of wireless beacons 602 transmits a wireless advertisement packet 604 at time $t_A$, which may represent any moment within an advertisement time period where advertisement packets 604 are being transmitted. For example, wireless beacon 602-a transmits a wireless advertisement packet 604-a, wireless beacon 602-b transmits a wireless advertisement packet 604-b, wireless beacon 602-c transmits a wireless advertisement packet 604-c, wireless beacon 602-d transmits a wireless advertisement packet 604-d. Each of wireless advertisement packets 604 include the same identifier, such that any device, such as smartphone 620, present in the environment 600 which receives one or more of wireless advertisement packets 604 will be presented with the same identifier at time $t_A$. In one embodiment, receipt of a wireless advertisement packet 604 by smartphone 620 can result in an application on smartphone 620 waking up and executing for a predetermined amount of time, even if the application is in a sleep state, such as if a listening service is monitoring for the identifier included in advertisement packets 604 and wakes the application upon receipt of the advertisement packet 604.

As will be understood by the skilled artisan, a wireless advertisement packet optionally includes a single identifier or multiple identifiers. In embodiments, a beacon identifier is a 20 byte string, which may be broken up into multiple identifiers. For example, a universally unique identifier (UUID) may be included in a wireless advertisement packet. UUIDs are known to the skilled artisan as a 16 byte identifier, which may also be referred to as a proximity UUID. Other smaller identifiers, such as 2 byte identifiers, may be included in a wireless advertisement packet, such as a second identifier and a third identifier, which may be referred to as Major and Minor identifiers. As described previously smartphone 602 can determine its location relative to one or more of beacons 602 using information from received wireless advertisement packets 604.

Figure 6B:
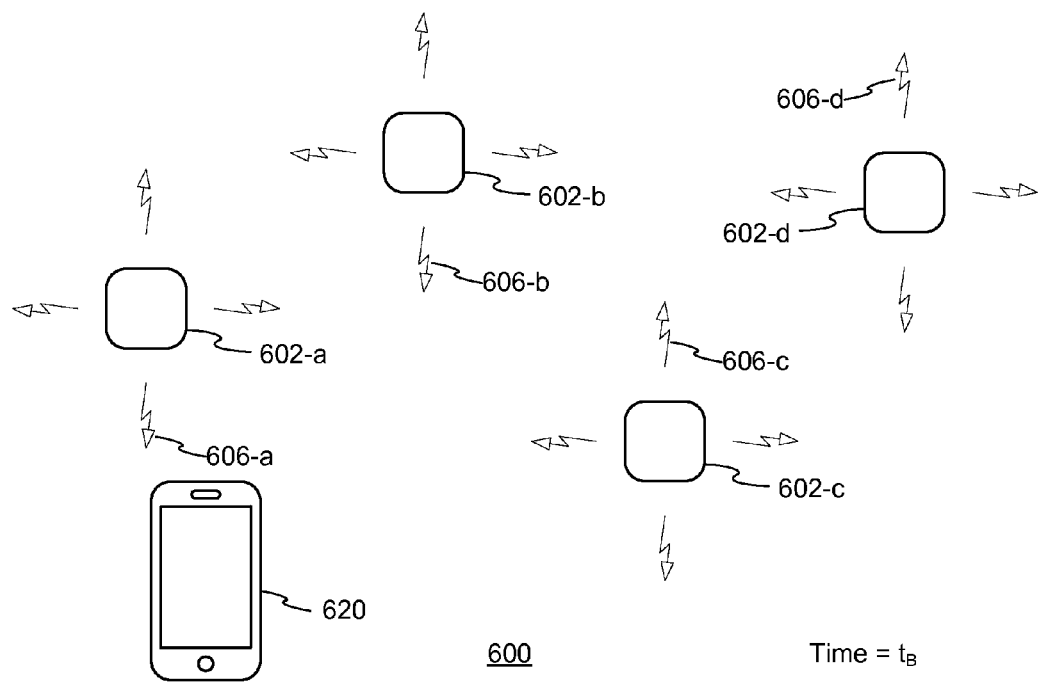

As illustrated in FIG. 6B, each of wireless beacons 602 transmits a wireless advertisement packet 606 at time $t_B$, which may represent any moment within an advertisement time period where advertisement packets 606 are being transmitted. For example, wireless beacon 602-a transmits a wireless advertisement packet 606-a, wireless beacon 602-b transmits a wireless advertisement packet 606-b, wireless beacon 602-c transmits a wireless advertisement packet 606-c, wireless beacon 602-d transmits a wireless advertisement packet 606-d. Each of wireless advertisement packets 606 include the same identifier, such that any device, such as smartphone 620, present in the environment 600 which receives one or more of wireless advertisement packets 606 will be presented with the same identifier at time $t_B$, albeit a different identifier than that included in advertisement packets 604. Further, as illustrated in FIG. 6B, smartphone 620 has moved relative to beacons 602 at time $t_B$ and can use information from received wireless packets 606 to determine its location. Advantageously, receipt of a wireless advertisement packet 606 by smartphone 620 can result in the application on smartphone 620 waking up and executing again for the predetermined amount of time, even if a timeout period for the identifier included in advertisement packet 604 has not expired. In embodiments, this occurs because the identifier included in advertisement packets 606 is different from that included in advertisement packets 604.

Figure 6C:
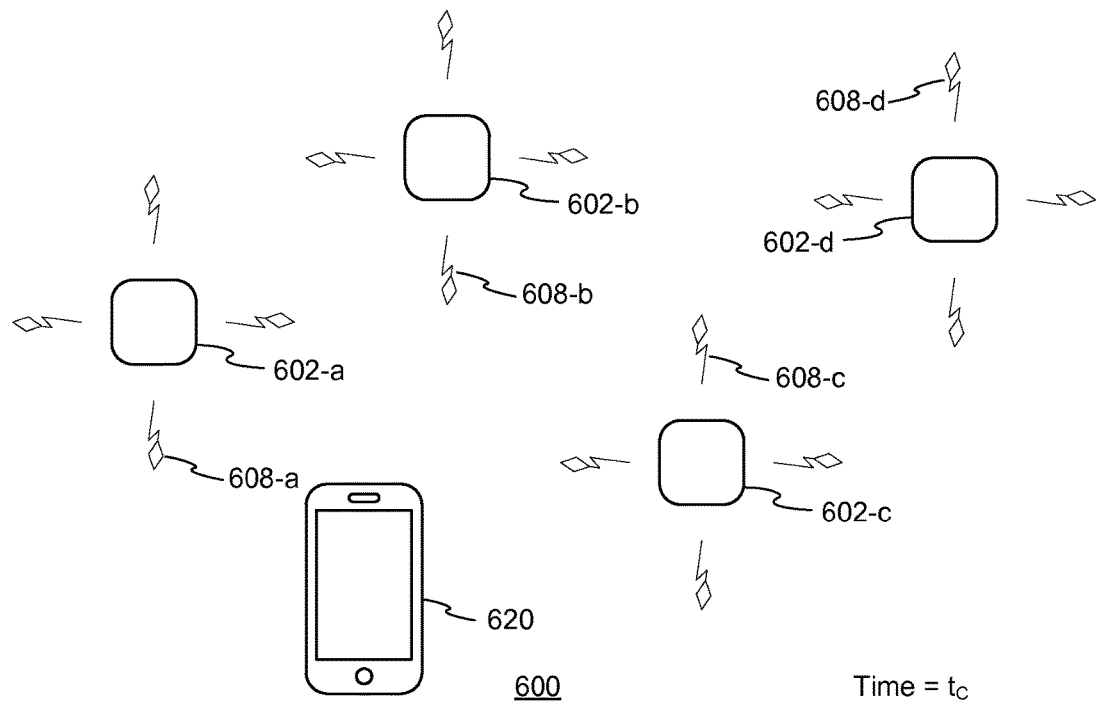

As illustrated in FIG. 6C, each of wireless beacons 602 transmits a wireless advertisement packet 608 at time $t_C$, which may represent any moment within an advertisement time period where advertisement packets 608 are being transmitted. For example, wireless beacon 602-a transmits a wireless advertisement packet 608-a, wireless beacon 602-b transmits a wireless advertisement packet 608-b, wireless beacon 602-c transmits a wireless advertisement packet 608-c, wireless beacon 602-d transmits a wireless advertisement packet 608-d. Each of wireless advertisement packets 608 include the same identifier, such that any device, such as smartphone 620, present in the environment 600 which receives one or more of wireless advertisement packets 608 will be presented with the same identifier at time $t_C$, albeit a different identifier than that included in advertisement packets 604 or 606. Further, as illustrated in FIG. 6C, smartphone 620 has moved relative to beacons 602 at time $t_C$ and can use information from received wireless packets 608 to determine its location. Advantageously, receipt of a wireless advertisement packet 608 by smartphone 620 can result in the application on smartphone 620 waking up and executing again for the predetermined amount of time, even if a timeout period for the identifier included in advertisement packet 604 and/or 606 has not expired. In embodiments, this occurs because the identifier included in advertisement packets 608 is different from that included in advertisement packets 604 and 606.

Figure 6D:
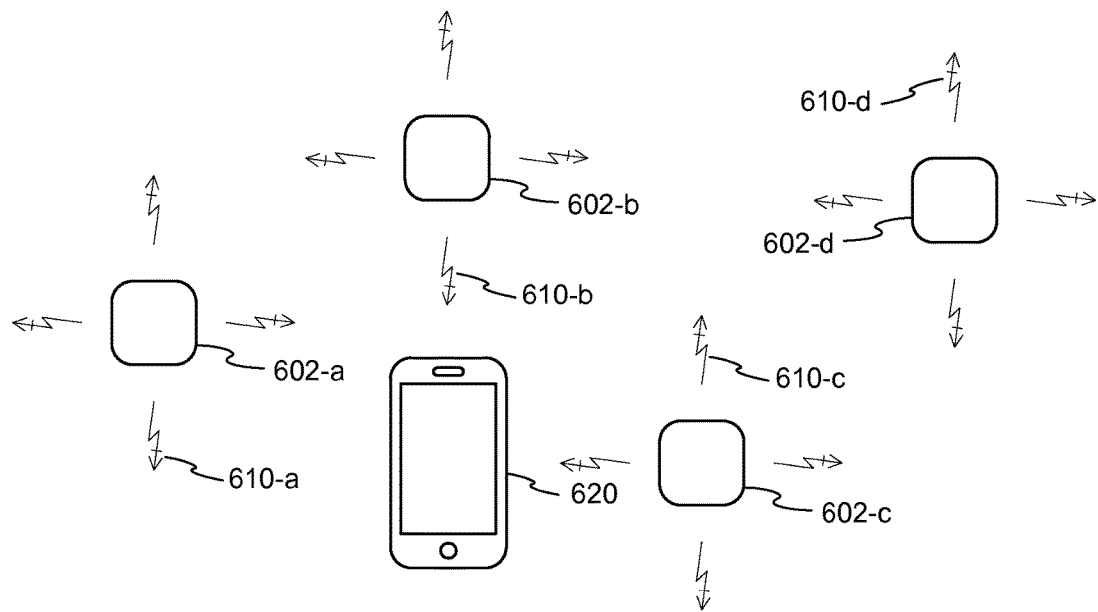

As illustrated in FIG. 6D, each of wireless beacons 602 transmits a wireless advertisement packet 610 at time $t_D$, which may represent any moment within an advertisement time period where advertisement packets 610 are being transmitted. For example, wireless beacon 602-a transmits a wireless advertisement packet 610-a, wireless beacon 602-b transmits a wireless advertisement packet 610-b, wireless beacon 602-c transmits a wireless advertisement packet 610-c, wireless beacon 602-d transmits a wireless advertisement packet 610-d. Each of wireless advertisement packets 610 include the same identifier, such that any device, such as smartphone 620, present in the environment 600 which receives one or more of wireless advertisement packets 610 will be presented with the same identifier at time $t_B$, albeit a different identifier than that included in advertisement packets 604, 606 or 610. Further, as illustrated in FIG. 6D, smartphone 620 has moved relative to beacons 602 at time $t_D$ and can use information from received wireless packets 610 to determine its location. Advantageously, receipt of a wireless advertisement packet 610 by smartphone 620 can result in the application on smartphone 620 waking up and executing again for the predetermined amount of time, even if a timeout period for the identifier included in advertisement packets 604, 606 and/or 608 has not expired. In embodiments, this occurs because the identifier included in advertisement packets 610 is different from that included in advertisement packets 604, 606 and 608.

As illustrated by FIGS. 6A-6D, each of the different beacons 602 are synchronized with the other beacons 602. Such a synchronization can occur by determining an advertisement order, such as that specifies the sequence of advertisement packets 604, 606, 608 and 610. Synchronization could also be achieved, in embodiments, through use of a schedule that proscribes not only the order of the sequence of advertisement packets 604, 606, 608 and 610 but also a schedule according to which the advertisement packets should be transmitted.

In various embodiments, each beacon can advertise multiple identifiers simultaneously. For example, a beacon advertisement may include a 16-byte UUID, a 2-byte Minor ID and a 2-byte Minor ID. Table 1 provides one specific example of the IDs included in advertisement packets 604, 606, 608, and 610, where each packet within a group includes a same UUID and Major ID but Minor IDs, depending on which beacon broadcasted the advertisement packet. Different groups use different UUIDs. This configuration is useful because it allows for various UUIDs to be monitored for, while various Minor IDs distinguish between the individual beacon devices. Other combinations of the same and different UUIDs, Major IDs and Minor IDs are possible and it is noted that the specific values listed in the tables provided are merely exemplary.

TABLE 1

| Advertisement Packet | UUID | Major ID | Minor ID |
|---|---|---|---|
| 604-a | 40A6A5D8-7D54-47FB-BFA3-FE2F27A82ADE | 1000 | 1000 |
| 604-b | 40A6A5D8-7D54-47FB-BFA3-FE2F27A82ADE | 1000 | 2000 |
| 604-c | 40A6A5D8-7D54-47FB-BFA3-FE2F27A82ADE | 1000 | 3000 |
| 604-d | 40A6A5D8-7D54-47FB-BFA3-FE2F27A82ADE | 1000 | 4000 |
| 606-a | 60A6A5D8-7D54-47FB-BFA3-FE2F27A82ADE | 1000 | 1000 |
| 606-b | 60A6A5D8-7D54-47FB-BFA3-FE2F27A82ADE | 1000 | 2000 |
| 606-c | 60A6A5D8-7D54-47FB-BFA3-FE2F27A82ADE | 1000 | 3000 |
| 606-d | 60A6A5D8-7D54-47FB-BFA3-FE2F27A82ADE | 1000 | 4000 |
| 608-a | 80A6A5D8-7D54-47FB-BFA3-FE2F27A82ADE | 1000 | 1000 |
| 608-b | 80A6A5D8-7D54-47FB-BFA3-FE2F27A82ADE | 1000 | 2000 |
| 608-c | 80A6A5D8-7D54-47FB-BFA3-FE2F27A82ADE | 1000 | 3000 |
| 608-d | 80A6A5D8-7D54-47FB-BFA3-FE2F27A82ADE | 1000 | 4000 |
| 610-a | 10A6A5D8-7D54-47FB-BFA3-FE2F27A82ADE | 1000 | 1000 |
| 610-b | 10A6A5D8-7D54-47FB-BFA3-FE2F27A82ADE | 1000 | 2000 |
| 610-c | 10A6A5D8-7D54-47FB-BFA3-FE2F27A82ADE | 1000 | 3000 |
| 610-d | 10A6A5D8-7D54-47FB-BFA3-FE2F27A82ADE | 1000 | 4000 |

Table 2 provides another specific example of the IDs included in advertisement packets 604, 606, 608, and 610, where each packet includes a same UUID but different Major and/or Minor IDs, depending on which beacon broadcasted the advertisement packet. This configuration is useful because it allows a single UUID to be monitored for, while various Major IDs distinguish between the advertisement orders/time and Minor IDs distinguish between the individual beacon devices.

TABLE 2

| Advertisement Packet | UUID | Major ID | Minor ID |
|---|---|---|---|
| 604-a | 38A6A5D8-7D54-47FB-BFA3-FE2F27A82ADE | 4000 | 1000 |
| 604-b | 38A6A5D8-7D54-47FB-BFA3-FE2F27A82ADE | 4000 | 2000 |
| 604-c | 38A6A5D8-7D54-47FB-BFA3-FE2F27A82ADE | 4000 | 3000 |
| 604-d | 38A6A5D8-7D54-47FB-BFA3-FE2F27A82ADE | 4000 | 4000 |
| 606-a | 38A6A5D8-7D54-47FB-BFA3-FE2F27A82ADE | 6000 | 1000 |
| 606-b | 38A6A5D8-7D54-47FB-BFA3-FE2F27A82ADE | 6000 | 2000 |
| 606-c | 38A6A5D8-7D54-47FB-BFA3-FE2F27A82ADE | 6000 | 3000 |
| 606-d | 38A6A5D8-7D54-47FB-BFA3-FE2F27A82ADE | 6000 | 4000 |
| 608-a | 38A6A5D8-7D54-47FB-BFA3-FE2F27A82ADE | 8000 | 1000 |
| 608-b | 38A6A5D8-7D54-47FB-BFA3-FE2F27A82ADE | 8000 | 2000 |
| 608-c | 38A6A5D8-7D54-47FB-BFA3-FE2F27A82ADE | 8000 | 3000 |
| 608-d | 38A6A5D8-7D54-47FB-BFA3-FE2F27A82ADE | 8000 | 4000 |
| 610-a | 38A6A5D8-7D54-47FB-BFA3-FE2F27A82ADE | 1000 | 1000 |
| 610-b | 38A6A5D8-7D54-47FB-BFA3-FE2F27A82ADE | 1000 | 2000 |

TABLE 2-continued

| Advertisement Packet | UUID | Major ID | Minor ID |
|---|---|---|---|
| 610-c | 38A6A5D8-7D54-47FB-BFA3-FE2F27A82ADE | 1000 | 3000 |
| 610-d | 38A6A5D8-7D54-47FB-BFA3-FE2F27A82ADE | 1000 | 4000 |

Figure 7:
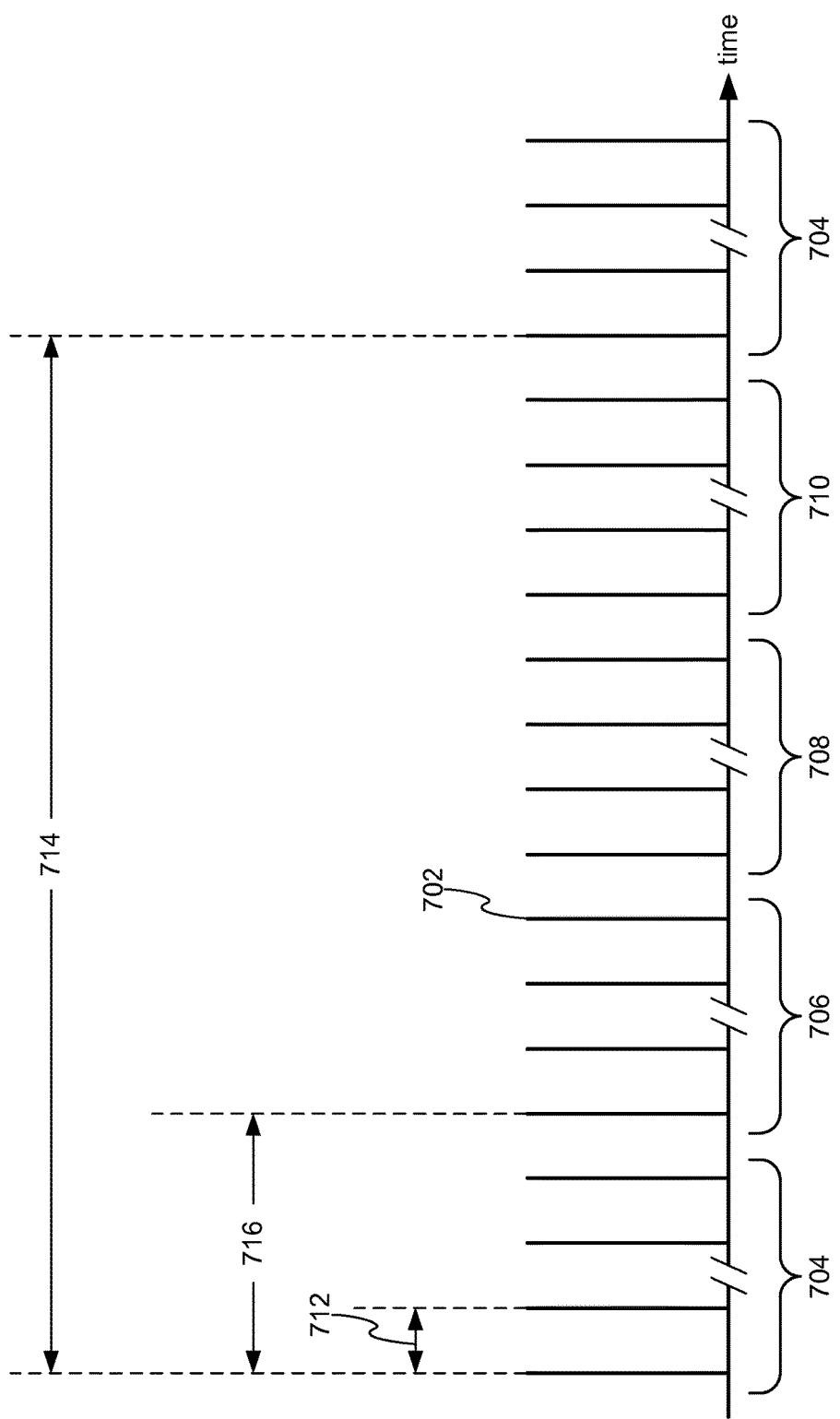
FIG. 7 provides a schematic illustration of a plot of transmission of wireless advertisement packets as a function of time.

FIG. 7 illustrates a schematic plot showing transmission of individual wireless advertisement packets 702 by a single wireless beacon as a function of time. The schematic plot of FIG. 7 is stylized as a plot of the transmission power as a function of time. Although all advertisement packets 702 shown in FIG. 7 are illustrated as having the same transmission power, the transmission power of any packet is optionally independent or dependent on that of other packets. With reference to FIGS. 6A-6D, packet groups 704, 706, 708, and 710 optionally correspond to advertisement packets 604, 606, 608, and 610.

As illustrated, the advertisement packets are arranged in an order where groups of advertisement packets 704, 706, 708, and 710 represent repeated transmissions of wireless advertisements, such as spaced in time by an advertisement interval 712, where advertisement packets within each group all include the same beacon identifier, but where advertisement packets within different groups include different beacon identifiers. For example, each of the four advertisement packets within group 704 is essentially identical and includes the same beacon identifier. With reference to beacon 602-a in FIG. 6A and Table 1, the four advertisement packets within group 704 may all correspond to wireless advertisement packet 604-a and include a UUID of 40A6A5D8-7D54-47FB-BFA3-FE2F27A82ADE, a Major ID of 1000 and a Minor ID of 1000. As will be understood by the skilled artisan, with reference to beacon 602-b in FIG. 6A and Table 1, the four advertisement packets within group 704 may correspond to wireless advertisement packet 604-b and include a UUID of 40A6A5D8-7D54-47FB-BFA3-FE2F27A82ADE, a Major ID of 1000 and a Minor ID of 2000. Additional representations can be taken for each of beacons 602-c and 602-d.

Similarly, each of the four advertisement packets within group 706 are essentially identical and include the same beacon identifier, however, different from the identifier included in advertisement packets within group 704. Again, with reference to beacon 602-a in FIG. 6B and Table 1, the four advertisement packets within group 706 may all correspond to wireless advertisement packet 606-a and include a UUID of 60A6A5D8-7D54-47FB-BFA3-FE2F27A82ADE, a Major ID of 1000 and a Minor ID of 1000. As will be understood by the skilled artisan, with reference to beacon 602-b in FIG. 6B and Table 1, the four advertisement packets within group 706 may correspond to wireless advertisement packet 606-b and include a UUID of 60A6A5D8-7D54-47FB-BFA3-FE2F27A82ADE, a Major ID of 1000 and a Minor ID of 2000. Again, additional representations can be taken for each of beacons 602-c and 602-d.

Further, each of the four advertisement packets within group 708 include the same beacon identifier, different from the identifier included in advertisement packets within groups 704 and 706. Each of the four advertisement packets within group 710 includes the same beacon identifier, different from the identifier included in advertisement packets within groups 704, 706 and 708. In this way, the advertisement packets can cycle through different beacon identifiers in a way that allows a central device to monitor for the different beacon identifiers to allow for continuous execution of an application.

As will be understood by the skilled artisan, the duration of the advertisement interval 712 may be proscribed by a specification, such as the iBeacon specification or the AltBeacon specification, by a beacon manufacturer, or may be adjusted or relaxed for other purposes, such as to conserve power by reducing the frequency of repeated advertisement packets. For example, an advertisement interval of 100 ms or 1000 ms is not uncommon. Further, although each group is illustrated as including four advertisement packets, this number is merely illustrative and any number of advertisement packets can be included within a group. In one embodiment the number of advertisement packets in a group corresponds to the predetermined time period that an application on a central device will execute divided by the advertisement interval. In an embodiment, advertisement time period 716 corresponds to the predetermined execution time period.

In an embodiment, after the sequences illustrated in FIGS. 6A-6D and FIG. 7, the order of transmission of wireless advertisement packets may be repeated one or an unlimited amount of times. For example, the packet sequence shown in FIG. 7 may be repeated as 704, 706, 708, 710, 704, 706, 708, 710, 704, 706, 708, 710, 704, 706, 708, 710 . . . . In some embodiments, additional wireless advertisement packets are included in the sequence before the sequence is repeated. For example, although the sequence illustrated in FIGS. 6A-6D and 6 includes four different beacon identifiers in wireless advertisement packets 604, 606, 608 and 610/704, 706, 708 and 710, the sequence may include more or fewer wireless advertisement packets with different beacon identifiers. In some embodiments, the number of independent beacon identifiers is equal to or greater than a timeout period or reset duration 714 for a beacon identifier divided by the advertisement time period 716 for a single beacon identifier. In some embodiments, the number of independent beacon identifiers used is limited by operating system or listening service limitations.

Figure 8:
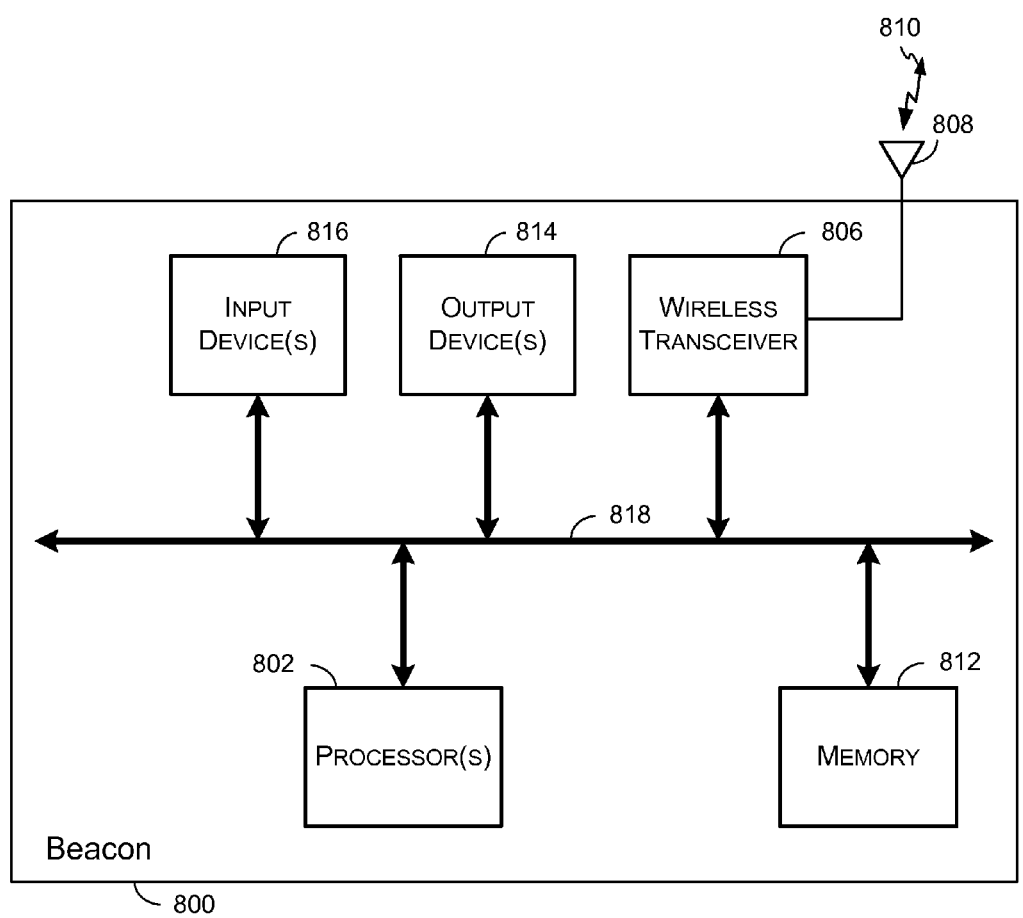
FIG. 8 is a block diagram illustrating an example of a beacon, in accordance with some embodiments.

FIG. 8 illustrates an example of a wireless beacon 800. The beacon 800 includes hardware elements that can be electrically coupled via a bus 818 (or may otherwise be in communication, as appropriate). In one embodiment, the bus 818 can be used for the processor(s) 802 to communicate between cores and/or with the memory 812. The hardware elements may include one or more processors 802, including without limitation one or more general-purpose processors and/or one or more special-purpose processors (such as digital signal processing chips, graphics acceleration processors, and/or the like); one or more input devices 816; one or more output devices 814; and one or more wireless transceivers 806. Optionally, input device 816 can include numerous devices including, without limitation, a camera, a mouse, a keyboard, a touch sensitive screen, a touch pad, a keypad, and/or the like. However, as a beacon is typically a low power or standalone device in many embodiments, few input devices may be included in a beacon. For example, embodiments are contemplated where no input devices are included. Other embodiments are included where a single input device is included, such as a button, which is optionally used to reset, power cycle a beacon or provide other input. Optionally, output device 814 can include numerous devices including, but not limited to, a display, a printer and/or the like. However, embodiments are contemplated where no output devices are included. Other embodiments are contemplated where only a single output device is included, such as a light emitting diode, that may provide a visible indication of a status of a beacon, for example.

The beacon 800 includes one or more wireless transceivers 806 connected to the bus 818. The wireless transceiver 806 may be operable to transmit and/or receive wireless signals (e.g., signal 810) via antenna 808. A wireless signal 810 received by beacon 800 may be transmitted via a wireless device compliant with a wireless communications standard that the beacon 800 supports. A wireless signal 810 transmitted by beacon 800 may be a wireless signal compliant with a wireless communications standard that the beacon 800 supports. For example, embodiments are contemplated where the wireless communications standard is one or more of Bluetooth, Zigbee, Z-Wave, and other low power radio frequency data communications standards. In an exemplary embodiment, the wireless communications standard is a Bluetooth standard, such as Bluetooth 4.0 and/or Bluetooth Low Energy. Wireless transceiver 806 may be configured to transmit and/or receive various radio frequency (RF) signals (e.g., signal 810) via antenna 808 from one or more central devices, peripheral devices, gateways, network devices, other access devices, cloud networks, and/or the like. Beacon 800 may also be configured to decode and/or decrypt various signals received. In some embodiments, the wireless beacon 800 is configured such that the wireless transceiver 806 only receives signals but does not transmit signals. In some embodiments, the wireless beacon 800 is configured such that the wireless transceiver 806 only transmits signals but does not receive signals. Optionally, wireless beacon 800 may communicate with other wireless beacons by way of wireless transceiver 806 and antenna 808, output device 814 and/or input device 816.

The beacon 800 may further include (and/or be in communication with) one or more non-transitory machine-readable storage mediums or storage devices (e.g., memory 812), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 812, such as RAM, ROM, FLASH, or disc drive, and executed by processor(s) 802. The beacon 800 can also comprise software elements (e.g., located within the memory 812), including, for example, an operating system, device drivers, executable libraries, and/or other code, such as one or more application programs, which may comprise computer programs implementing various functions. Memory 812 may be a non-transitory machine-readable storage medium, processor-readable memory, and/or a computer-readable memory that stores the one or more computer-program products configured to cause the processor(s) 802 to perform various functions. In other embodiments, various functions described may be performed in hardware.

Figure 9:
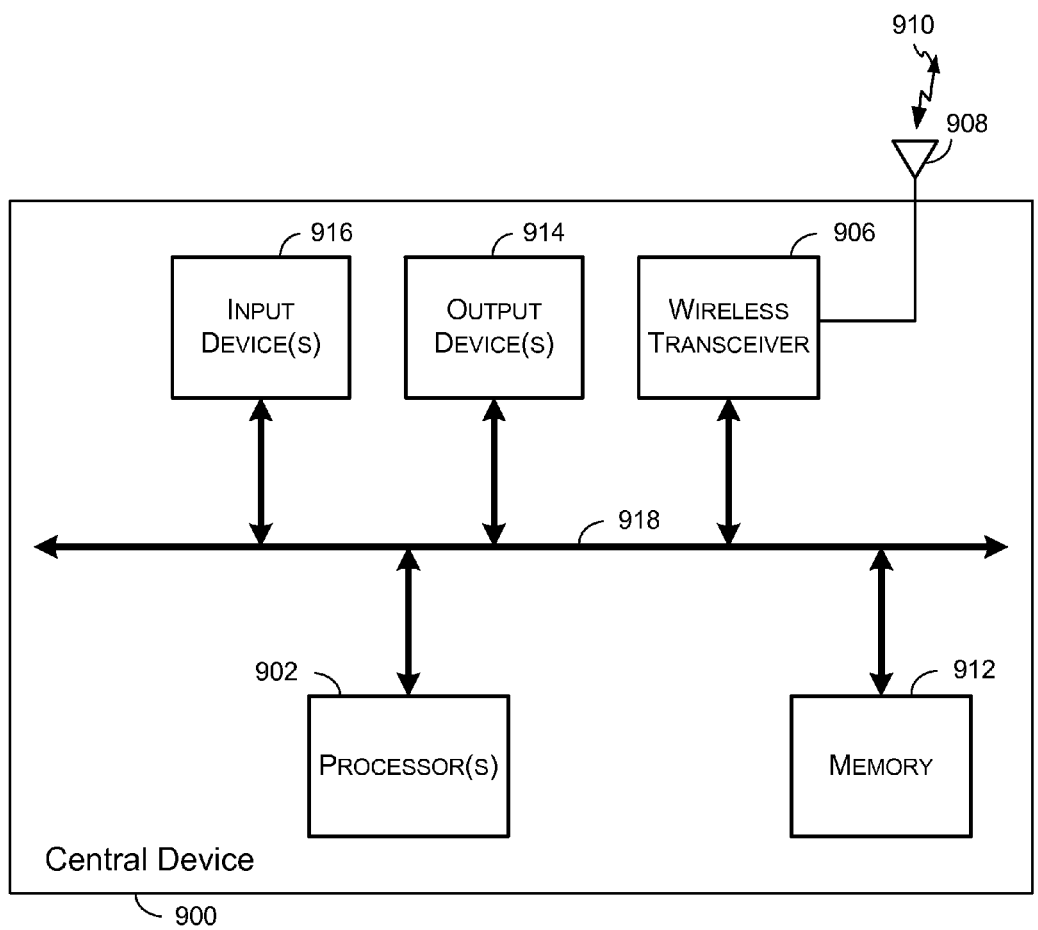
FIG. 9 is a block diagram illustrating an example of a central device, in accordance with some embodiments.

FIG. 9 illustrates an example of a central device 900. The central device 900 may optionally include or otherwise function as a computing device, network device, mobile device, etc. The central device 900 includes hardware elements that can be electrically coupled via a bus 918 (or may otherwise be in communication, as appropriate). In one embodiment, the bus 918 can be used for the processor(s) 902 to communicate between cores and/or with the memory 912. The hardware elements may include one or more processors 902, including without limitation one or more general-purpose processors and/or one or more special-purpose processors (such as digital signal processing chips, graphics acceleration processors, and/or the like); one or more input devices 916, which can include without limitation one or more buttons, a keyboard, a keypad, a touch sensitive screen, a touch pad, and/or the like; and one or more output devices 914, which can include, without limitation, a display, light or sound indicators, and/or the like. Input device 916 and output device 914 may also include a network transceiver, including a wireless network transceiver, for network communication with other devices.

The central device 900 may include one or more wireless transceivers 906 connected to the bus 918. The wireless transceiver 906 may be operable to receive and transmit wireless signals (e.g., a wireless signal 910) via an antenna 908. The wireless transceiver 906 may include a transceiver radio designed to transmit and receive signals in compliance with a wireless communications standard. Exemplary wireless communications standards include, but are not limited to, IEEE 802.11 (also referred to herein as WiFi or Wi-Fi), Bluetooth, Zigbee, UWB, wireless USB and Z-Wave. In various embodiments, a wireless communications standard specifies frequency bands, channels, data packet characteristics and other transmission characteristics necessary for inter device-communication. For example, wireless transceiver 906 may include a 2.4 GHz WiFi circuit. Accordingly, the access point 900 may include a single WiFi circuit for a WiFi communications, and a single Bluetooth circuit for Bluetooth communications. In some embodiments, the central device 900 may include multiple wireless transceivers (not shown) for each available communications standard. The antenna 908 may include multiple band antennas that can transmit and/or receive signals over different frequency bands.

The central device 900 may further include a radio frequency (RF) circuit. In some embodiments, the wireless transceiver 906 may be integrated with or coupled to the RF circuit so that the RF circuit includes the wireless transceiver 906. In some embodiments, the wireless transceiver 906 and the RF circuit are separate components. The RF circuit may include a RF amplifier that may amplify signals received over antenna 908. The RF circuit may also include a power controller that may be used to adjust signal amplification by the RF amplifier. The power controller may be implemented using hardware, firmware, software, or any combination thereof.

The wireless signal 910 may be transmitted via a wireless communication channel. In some embodiments, the wireless communication channel may be any wireless communication channel established between two or more devices, such as a wireless local area network (e.g., a WiFi network), a Personal Access Network (e.g., between Bluetooth, Zigbee, UWB or wireless USB compatible devices), or a cellular network (e.g., a GSM, WCDMA, LTE, CDMA2000 network). The wireless transceiver 906 may be configured to receive various radio frequency (RF) signals (e.g., signal 910) via antenna 908, respectively, from one or more access points, network devices, wireless devices, beacons and/or the like. Central device 900 may also be configured to decode and/or decrypt various signals received from one or more access points, network devices, wireless devices, and/or the like.

The central device 900 may include a power supply (not shown) that can power the various components. The power supply may include a switch-mode power supply, a linear power supply, a push-pull power supply, or any other suitable type of power supply. In some embodiments, the central device 900 may include multiple power supplies. For example, a switch-mode power supply may be used to condition input power, and a linear power supply may be used to power the RF circuit. The power supply may be configured to operate over various ranges of appropriate input voltages. Alternatively or additionally, power may be supplied to central device from one or more battery cells.

The central device 900 may further include (and/or be in communication with) one or more non-transitory machine-readable storage mediums or storage devices (e.g., memory 912), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 912, such as RAM, ROM, FLASH, or disc drive, and executed by processor(s) 902. The central device 900 can also comprise software elements (e.g., located within the memory 912), including, for example, an operating system, device drivers, executable libraries, and/or other code, such as one or more application programs, which may comprise computer programs implementing the functions provided by various embodiments, and/or may be designed to implement methods and/or configure systems, as described herein.

Figure 10:
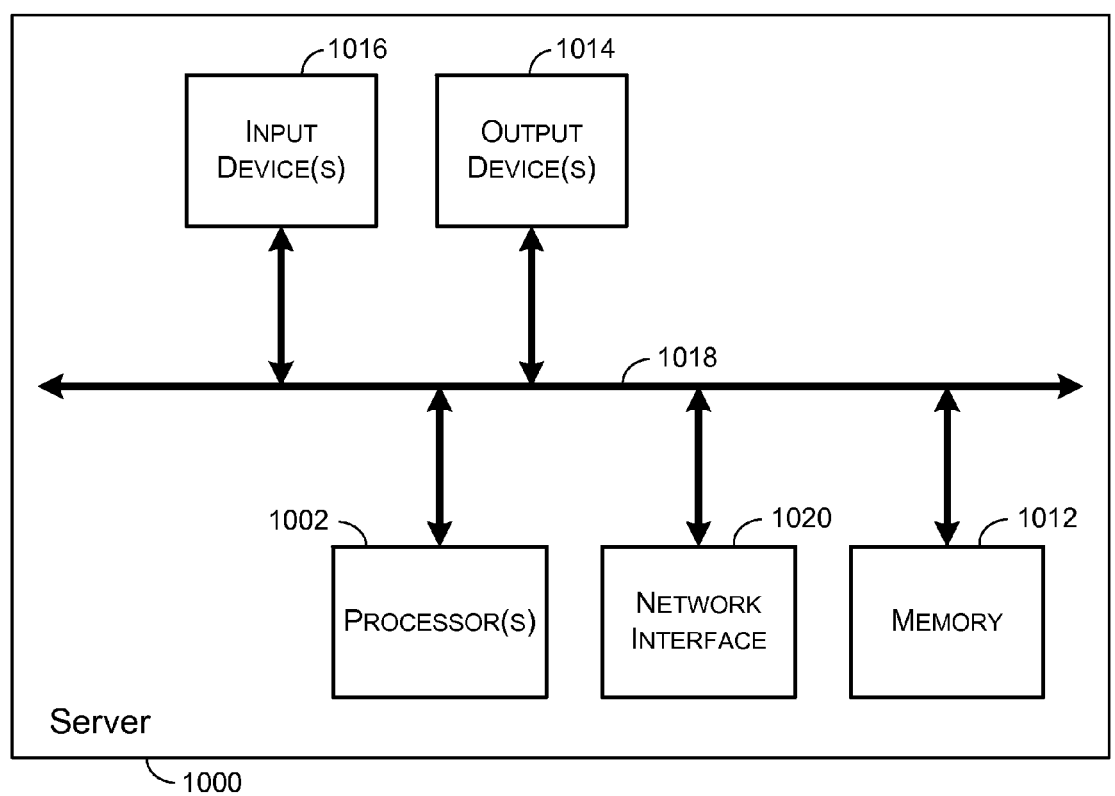
FIG. 10 is a block diagram illustrating an example of a server, in accordance with some embodiments.

FIG. 10 illustrates an example of a server 1000. The server 1000 includes hardware elements that can be electrically coupled via a bus 1018 (or may otherwise be in communication, as appropriate). In one embodiment, the bus 1018 can be used for the processor(s) 1002 to communicate between cores and/or with the memory 1012. The hardware elements may include one or more processors 1002, including without limitation one or more general-purpose processors and/or one or more special-purpose processors (such as digital signal processing chips, graphics acceleration processors, and/or the like), memory 1012, output devices 1014, input devices 1016, a bus 1018 and a network interface. Furthermore, in addition to the network interface 1020, server 1000 can optionally further include a wireless transceiver and antenna to communicate with a network (e.g., a wireless local area network, a wireless network of a preferred carrier, Internet, etc.).

The server 1000 may further include (and/or be in communication with) one or more non-transitory machine-readable storage mediums or storage devices (e.g., memory 1012), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 1012. The server 1000 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the aspects of methods described herein, such as centralized management and control over wireless access points, beacons, etc. The memory 1012 may be a non-transitory machine-readable storage medium, processor-readable memory, and/or a computer-readable memory that stores the one or more computer-program products configured to cause the processor(s) 1002 to perform the functions described. In other embodiments, one or more of the functions described may be performed in hardware.

A set of these instructions and/or code is optionally stored on a non-transitory machine-readable storage medium, such as the memory 1012. In some cases, the storage medium is optionally incorporated within a computer system. In other embodiments, the storage medium is optionally separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 1000 and/or may take the form of source and/or installable code, which, upon compilation and/or installation on the server 1000 (e.g., using any of a variety of generally available compilers, installation programs, compression/decompression utilities, etc.) then takes the form of executable code.

Merely by way of example, one or more procedures described with respect to the processes and methods discussed herein, for example as described with respect to FIG. 5, may be implemented as code and/or instructions executable by a computer or device (and/or a processor within a computer or device); in an aspect, then, such code and/or instructions can be used to configure and/or adapt a general purpose computer (or other device) to perform one or more operations in accordance with the described methods. Such functions or code may include code to perform the steps described above with respect to FIG. 5. The memory may be a non-transitory machine-readable storage medium, processor-readable memory, and/or a computer-readable memory that stores the one or more computer-program products configured to cause the processor(s) to perform the functions described. In other embodiments, one or more of the functions described may be performed in hardware.

A set of these instructions and/or code might be stored on a non-transitory machine-readable storage medium, such as the memory. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by a computer or device and/or might take the form of source and/or installable code, which, upon compilation and/or installation on the computer or device (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

EXAMPLES

Aspects of the invention may be further understood by reference to the following non-limiting examples.

Example 1

Client devices are optionally tracked in real time based on IEEE 802.11 (WiFi) compliant wireless signals comprising probe requests that are transmitted by the client devices. Some client devices (e.g., devices executing iOS) do not probe regularly and are therefore difficult to track in real time based on transmitted probes.

Advertisement of specific ids by wireless beacon devices can cause client devices to wake up from a sleep mode (low battery usage mode) and execute code for a limited amount of time (referred to herein as a "wake up period") caused by receiving a specific identifier (ID). The code may be configured for transmitting probes or performing other functions, such as performing self-location determination based on received advertisements. Accordingly, wireless beacon devices may be configured to advertise these specific IDs to periodically wake up a client device from a sleep mode, which results in the client device transmitting WiFi probe requests for the limited amount of time.

Each specific ID in the list of specific IDs that can cause client devices to wake up is only effective once for a limited number of times (for example, effective once) until a reset period (may be referred to herein as "wait time") is completed after that specific ID was used to wake the specific client up or completion of the wake up period. In an example, ID X is advertised to wake up the client and the client is configured to accept ID X as a wake up-ID one time every 100 seconds. In this example, ID X is first used to wake up a client device for 10 seconds at 2 minutes 32 seconds, i.e., from 2 minutes 32 seconds to 2 minutes 42 seconds. Thereafter, ID X will not be effective for waking up the client till 100 seconds have passed from the first wake up time of 2 minutes 32 seconds or after completion of the wake up period at 2 minutes 42 seconds, i.e., ID X will not be effective to wake up the client device until 4 minutes 12 seconds.

In an embodiment, multiple specific IDs are advertised by a beacon device to cause a client device to wake up. The advertisement of the specific IDs is spread out over the reset period or wait time described above to maximize and/or optimize the wake up period for the client device. In an example, six different IDs (ID 1, ID 2, ID 3, ID 4, ID 5, ID 6) are each broadcasted by beacon to wake up client devices. The client devices are configured to wake up for 10 seconds after any particular one ID of the six IDs is received and is configured to not wake up for that particular one id until at least 50 seconds have passed after the device wake up caused by the particular one ID or the wake up period caused by the particular one ID elapses. The Beacon advertises ID 1 at second 0 to cause the client device to wake up from seconds 0-10, advertises ID 2 at second 10 to cause the client device to wake up from seconds 10-20, advertises ID 3 at second 20 to cause the client device to wake up from seconds 20-30, advertises ID 4 at second 30 to cause the client device to wake up from seconds 30-40, advertises ID 5 at second 40 to cause the client device to wake up from seconds 40-50, and advertises ID 6 from seconds 50-60. At second 60 (which is 50 seconds from second 10—the end of the wake up period caused by ID 1), ID 1 may again be effectively used to wake up the client device and the cycle is repeated.

In one example, uncoordinated IDs advertised by multiple beacon devices within an environment may wake up client devices in a random or sporadic manner. Uncoordinated advertising of IDs may result in inefficient use of the IDs for waking up the client devices. Instead of the specific IDs being evenly distributed over the reset time or wait period to maximize or optimize the wake up periods, different beacon devices may advertise different IDs at the same time. As a result, client devices will initially wake up during this period of time as a result of the IDs received by the client device. Furthermore, the client devices will register each of the IDs received and refrain from waking up for any of the received IDs until the corresponding wait time is completed. The wake up effect of each ID may be used up within a single period of time. As a result, subsequent to the wake up period, the clients may fail to wake up for the wait time or reset period because each of the IDs that can cause a wake up of the client device have previously been received by the client device from at least one of the multiple beacon devices. The client devices may then only wake up once the wait time after the wake up period caused by the first received ID is completed. Uncoordinated advertising of IDs may result in an inefficient use of the IDs by the network devices for keeping a client device awake.

In an embodiment, IDs advertised by multiple network devices to wake up client devices are coordinated. In an example, each of two or more beacon devices in an environment advertise ID 1 at second 0 or in the period from second 0 to second 10 that is previously determined to be assigned for ID 1. Further, the two or more beacon devices may advertise ID 2 at second 10 or in the period from second 10 to second 20. Further, the two or more beacon devices may advertise ID 3 at second 20 or in the period from second 20 to second 30. Similarly, the advertising of ID 4 is coordinated between the two or more beacon devices, the advertising of ID 5 is coordinated between the two or more beacon devices, and the advertisement of ID 6 is coordinated between the two or more beacon devices. Coordinating IDs advertised by multiple network devices in this fashion ensures that the wake up effect of IDs is spread out over time and the wake time for client devices is maximized or optimized.

In an embodiment, when the client device is awakened, it could run any number of functions, one of which could be a scan of all devices around and or a receipt of beacon signals from various beacon devices and determination of their relative signal strengths. These signal strengths could then be used to calculate the location of the device.

Example 2

Apple recently introduced a new technology called iBeacon. iBeacon is not a physical object but rather a protocol which specifies that Bluetooth devices can advertise with a particular string and iPhones are specially designed to wake up when they receive these advertisements in a wireless signal.

Traditionally, on iOS, Apple prevents applications from executing code in the background while the device is in a sleep mode. iBeacon is useful to applications because the iOS is constantly listening for iBeacon advertisements even while the device is in sleep mode. When iOS hears an iBeacon advertisement that an installed application has asked it to listen for, the OS will wake up the application for approximately 10 seconds to allow that application to execute code. At the end of the 10 seconds, the application has to stop executing code.

Additionally, after the device has been woken up as a result of receiving a particular ID, iOS will refrain from waking by the device up from sleep mode for that same particular ID until n seconds (e.g., 30 seconds or 60 seconds) have passed since the last wake up period resulting from receiving the particular ID.

In accordance with an embodiment, a beacon device can keep an application executing on a client device by coordinating the transmission of the IDs that result in waking the client device up from sleep mode.

In an example, beacons advertisements transmitted by beacon devices in a same space are configured to all advertise one ID of those available at the same time. For example, every beacon transmitting that same ID concurrently, i.e., all beacons transmit advertisements with the same ID for about 10 seconds. At the end of the 10 seconds, all the beacons in the space then change to a second ID for about 10 seconds, then to a 3rd, but not repeated, ID. Then to a 4th for about 10 seconds, and then to the 5th, not repeated ID. After the last ID has been transmitted, all the beacons switch back to advertising the first ID, repeating the cycle.

Meanwhile, the client device is configured to listen for these IDs. When it hears one of these, it will begin to execute code in the background. This code can do any number of things, such as, for example, run a scan to determine its location. When the broadcasting of the first ID stops and the broadcasting of a second ID begins, the device will again be configured to execute code for another 10 seconds. This pattern will repeat until with different IDs, until the rotation of IDs being broadcasted returns to the first ID. By the time the first ID is again broadcasted, the reset period for the first ID will be completed and receiving the first ID will cause the client device to execute application code.

Although specific advertisement intervals, wait times, code execution times, and numbers of IDs are described in the above examples, embodiments are applicable to any variations in these values.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer implemented method, comprising:
   determining, by a wireless beacon, a synchronized advertisement order, wherein the synchronized advertisement order identifies a sequence for transmitting a plurality of wireless advertisement packets, wherein the synchronized advertisement order is associated with concurrent wireless advertisement packet transmissions by multiple wireless beacons, and wherein wireless advertisement packets transmitted concurrently by multiple wireless beacons include a same beacon identifier;
   transmitting a first wireless advertisement packet according to the synchronized advertisement order, wherein the first wireless advertisement packet includes a first beacon identifier, and wherein receiving a wireless advertisement packet including the first beacon identifier at a wireless device causes the wireless device to execute an application for a predetermined amount of time;
   transmitting a second wireless advertisement packet according to the synchronized advertisement order, wherein the second wireless advertisement packet includes a second beacon identifier, wherein the second beacon identifier is different from the first beacon identifier, and wherein receiving a wireless advertisement packet including the second beacon identifier at the wireless device causes the wireless device to execute the application for the predetermined amount of time;

determining, by the wireless device, a signal strength of the first wireless advertisement packet and a signal strength of the second wireless advertisement packet; and calculating, by the wireless device, a location of the wireless device based on the relative strengths of the first and second wireless advertisement packets.

2. The method of claim 1, wherein the sequence is repeated.

3. The method of claim 1, further comprising:

transmitting an additional wireless advertisement packet according to the synchronized advertisement order, wherein the additional advertisement packet includes an additional beacon identifier, wherein the additional beacon identifier is different from the first beacon identifier, wherein the additional beacon identifier is different from the second beacon identifier, and wherein receiving a wireless advertisement packet including the additional beacon identifier at the wireless device causes the wireless device to execute the application for the predetermined amount of time.

4. The method of claim 1, wherein transmitting a wireless advertisement packet according to the synchronized advertisement order includes transmitting a plurality of wireless advertisement packets during an advertisement time period, wherein the plurality of wireless advertisement packets includes a same beacon identifier, and wherein the advertisement time period corresponds to the predetermined amount of time.

5. The method of claim 1, wherein the synchronized advertisement order indicates that the sequence is to be repeated after a wireless advertisement reset duration of a wireless device, wherein a wireless advertisement reset duration corresponds to a time period during which repeated wireless advertisement packets including a same beacon identifier received at the wireless device do not cause the wireless device to execute the application more than once.

6. The method of claim 1, further comprising:

synchronizing transmissions of wireless advertisement packets according to an advertisement schedule, wherein the advertisement schedule identifies wireless advertisement packet transmission times.

7. The method of claim 1, wherein the first beacon identifier is a first universally unique identifier (UUID), wherein the second beacon identifier is a second UUID, wherein wireless advertisement packets include additional beacon identifiers, and wherein a first additional beacon identifier of the first wireless advertisement packet and a second additional beacon identifier of the second wireless advertisement packet are a same additional beacon identifier.

8. A system, comprising:

one or more data processors; and a non-transitory computer readable storage medium containing instructions which when executed on the one or more data processors, cause the one or more data processors to perform operations that comprise:

determine, by a wireless beacon, a synchronized advertisement order, wherein the synchronized advertisement order identifies a sequence for transmission of a plurality of wireless advertisement packets, wherein the synchronized advertisement order is associated with concurrent wireless advertisement packet transmissions by multiple wireless beacons, and wherein wireless advertisement packets transmitted concurrently by multiple wireless beacons include a same beacon identifier;

transmit a first wireless advertisement packet according to the synchronized advertisement order, wherein the first wireless advertisement packet includes a first beacon identifier, and wherein receipt of a wireless advertisement packet including the first beacon identifier at a wireless device causes the wireless device to execute an application for a predetermined amount of time;

transmit a second wireless advertisement packet according to the synchronized advertisement order, wherein the second wireless advertisement packet includes a second beacon identifier, and wherein receipt of a wireless advertisement packet including the second beacon identifier at the wireless device causes the wireless device to execute the application for the predetermined amount of time; and wherein the second beacon identifier is different from the first beacon identifier to indicate the order of transmission of the first wireless advertisement packet in the sequence of the synchronized advertisements relative to the transmission of the second wireless advertisement packet.

9. The system of claim 8, wherein the sequence is repeated.

10. The system of claim 8, wherein the operations further include:

transmit an additional wireless advertisement packet according to the synchronized advertisement order, wherein the additional advertisement packet includes an additional beacon identifier, wherein the additional beacon identifier is different from the first beacon identifier, wherein the additional beacon identifier is different from the second beacon identifier, and wherein receipt of a wireless advertisement packet including the additional beacon identifier at the wireless device causes the wireless device to execute the application for the predetermined amount of time.

11. The system of claim 8, wherein to transmit a wireless advertisement packet according to the synchronized advertisement order includes to transmit a plurality of wireless advertisement packets during an advertisement time period, wherein the plurality of wireless advertisement packets includes a same beacon identifier, and wherein the advertisement time period corresponds to the predetermined amount of time.

12. The system of claim 1, wherein the synchronized advertisement order indicates that the sequence is to be repeated after a wireless advertisement reset duration of a wireless device, wherein a wireless advertisement reset duration corresponds to a time period during which repeated wireless advertisement packets including a same beacon identifier received at the wireless device do not cause the wireless device to execute the application more than once.

13. The system of claim 8, wherein the operations further include:

synchronize transmissions of wireless advertisement packets according to an advertisement schedule, wherein the advertisement schedule identifies wireless advertisement packet transmission times.

14. The system of claim 8, wherein the first beacon identifier is a first universally unique identifier (UUID), wherein the second beacon identifier is a second UUID, wherein wireless advertisement packets include additional beacon identifiers, and wherein a first additional beacon identifier of the first wireless advertisement packet and a second additional beacon identifier of the second wireless advertisement packet are a same additional beacon identifier.

15. A non-transitory computer readable medium comprising instructions that, when executed by one or more processors, cause the one or more processors to perform operations that comprise:
- determine, by a wireless beacon, a synchronized advertisement order, wherein the synchronized advertisement order identifies a sequence for transmission a plurality of wireless advertisement packets, wherein the synchronized advertisement order is associated with concurrent wireless advertisement packet transmissions by multiple wireless beacons, and wherein wireless advertisement packets transmitted concurrently by multiple wireless beacons include a same beacon identifier;
- transmit a first wireless advertisement packet according to the synchronized advertisement order, wherein the first wireless advertisement packet includes a first beacon identifier, and wherein receipt of a wireless advertisement packet including the first beacon identifier at a wireless device causes the wireless device to execute an application for a predetermined amount of time; and
- transmit a second wireless advertisement packet according to the synchronized advertisement order, wherein the second wireless advertisement packet includes a second beacon identifier, and wherein receipt of a wireless advertisement packet including the second beacon identifier at the wireless device causes the wireless device to execute the application for the predetermined amount of time; and
- wherein the second beacon identifier is different from the first beacon identifier to enable execution by the wireless device of the second wireless advertisement packet for the predetermined amount of time during a reset duration of the first beacon identifier.

16. The non-transitory computer readable medium of claim 15, wherein the sequence is repeated.

17. The non-transitory computer readable medium of claim 15, further comprising instructions that, when executed by the one or more processors, cause the one or more processors to perform:
- transmit an additional wireless advertisement packet according to the synchronized advertisement order, wherein the additional advertisement packet includes an additional beacon identifier, wherein the additional beacon identifier is different from the first beacon identifier, wherein the additional beacon identifier is different from the second beacon identifier, and wherein receipt of a wireless advertisement packet including the additional beacon identifier at the wireless device causes the wireless device to execute the application for the predetermined amount of time.

18. The non-transitory computer readable medium of claim 15, wherein to transmit a wireless advertisement packet according to the synchronized advertisement order includes to transmit a plurality of wireless advertisement packets during an advertisement time period, wherein the plurality of wireless advertisement packets includes a same beacon identifier, and wherein the advertisement time period corresponds to the predetermined amount of time.

19. The non-transitory computer readable medium of claim 15, wherein the synchronized advertisement order indicates that the sequence is to be repeated after a wireless advertisement reset duration of a wireless device, wherein a wireless advertisement reset duration corresponds to a time period during which repeated wireless advertisement packets including a same beacon identifier received at the wireless device do not cause the wireless device to execute the application more than once.

20. The non-transitory computer readable medium of claim 15, further comprising instructions that, when executed by the one or more processors, cause the one or more processors to perform:
- synchronize transmissions of wireless advertisement packets according to an advertisement schedule, wherein the advertisement schedule identifies wireless advertisement packet transmission times.

* * * * *